(12) United States Patent
Messina et al.

(10) Patent No.: US 11,709,907 B1
(45) Date of Patent: Jul. 25, 2023

(54) OFFLINE TO ONLINE CONVERSION LINKAGE

(71) Applicant: the dtx company, New York, NY (US)

(72) Inventors: Jay Messina, Weston, MA (US); Brendan Walsh, Brooklyn, NY (US)

(73) Assignee: the dtx company, New York, NY (US)

( * ) Notice: Subject to any disclaimer, the term of this patent is extended or adjusted under 35 U.S.C. 154(b) by 0 days.

(21) Appl. No.: 18/104,740

(22) Filed: Feb. 1, 2023

(51) Int. Cl.
*G06F 16/955* (2019.01)
*G06K 7/14* (2006.01)

(52) U.S. Cl.
CPC ....... *G06F 16/9558* (2019.01); *G06K 7/1417* (2013.01)

(58) Field of Classification Search
CPC .. G06K 7/1404; G06K 7/1413; G06K 7/1417; G06F 16/9558
See application file for complete search history.

(56) References Cited

U.S. PATENT DOCUMENTS

| | | |
|---|---|---|
| 7,467,356 B2 | 12/2008 | Gettman et al. |
| 7,504,949 B1 | 3/2009 | Rouaix et al. |
| D697,529 S | 1/2014 | Judge Cornish |
| D702,723 S | 4/2014 | Abratowski et al. |
| 8,756,124 B1 | 6/2014 | Sayers, III et al. |
| D723,104 S | 2/2015 | Cho et al. |
| 9,201,975 B2 | 12/2015 | Hall |
| D769,296 S | 10/2016 | Grecia |
| 9,704,081 B2 | 7/2017 | Tanaka et al. |
| 9,936,249 B1 | 4/2018 | Nelson et al. |
| D826,955 S | 8/2018 | Grecia |
| D857,054 S | 8/2019 | Grecia |
| 10,375,060 B1 | 8/2019 | Graves et al. |
| D860,256 S | 9/2019 | Stephen |
| 10,460,138 B2 | 10/2019 | Barnum |
| 10,586,227 B2 | 3/2020 | Makhdumi et al. |
| 10,803,432 B1 | 10/2020 | Miles |
| D905,743 S | 12/2020 | Jewitt |
| 10,949,725 B1 | 3/2021 | Alvarez-Cohen et al. |
| 10,963,868 B1 | 3/2021 | McCauley et al. |
| D918,936 S | 5/2021 | Walsh et al. |
| 11,010,650 B1 | 5/2021 | Devlin et al. |
| 11,106,753 B1 | 8/2021 | Fowler et al. |

(Continued)

OTHER PUBLICATIONS

Teemu Raitaluoto, "Four Most Important Website Conversion Events You Should Track," Markettailor Oy, Dec. 22, 2022.

(Continued)

*Primary Examiner* — Laura A Gudorf
(74) *Attorney, Agent, or Firm* — Weiss & Arons LLP

(57) ABSTRACT

This disclosure relates to electronically linking offline user activity to online activity of that user. Linking offline to online activity provides real-time feedback on traffic flow from a machine-readable label ("MRL") scan to a conversion event on a target website. Linking offline to online activity enables tracking of specific MRLs and conversion events associated therewith. Linking offline to online activity enables calculating benchmarks such as time to conversion event and best performing conversion locations for an MRL. Linking offline to online activity enhances security and data quality as each conversion event can be traced back to a unique MRL scan and a timestamp and geolocation associated with the unique MRL scan.

29 Claims, 12 Drawing Sheets

(56) References Cited

U.S. PATENT DOCUMENTS

| | | | |
|---|---|---|---|
| 11,120,095 | B2 | 9/2021 | Askarian et al. |
| D936,699 | S | 11/2021 | McDonald |
| 11,182,768 | B2 | 11/2021 | Fowler et al. |
| D939,570 | S | 12/2021 | Dye et al. |
| 11,194,981 | B2 | 12/2021 | Filter et al. |
| 11,205,105 | B1 | 12/2021 | Devlin et al. |
| 11,206,432 | B1 | 12/2021 | Fowler et al. |
| 11,263,282 | B2 | 3/2022 | Fowler et al. |
| 11,288,661 | B2 | 3/2022 | Hammad et al. |
| 11,334,779 | B1 | 5/2022 | Schwarzberg |
| 11,347,823 | B2 | 5/2022 | Askarian et al. |
| 11,379,820 | B2 | 7/2022 | Mossoba et al. |
| 2002/0032791 | A1 | 3/2002 | Isherwood et al. |
| 2002/0139839 | A1 | 10/2002 | Catan |
| 2004/0123223 | A1 | 6/2004 | Halford |
| 2004/0246529 | A1 | 12/2004 | Pruden et al. |
| 2006/0196950 | A1 | 9/2006 | Kiliccote |
| 2006/0215931 | A1 | 9/2006 | Shimomukai |
| 2007/0035327 | A1 | 2/2007 | Baeckler et al. |
| 2007/0286455 | A1 | 12/2007 | Bradley |
| 2009/0094175 | A1 | 4/2009 | Provos et al. |
| 2009/0240816 | A1 | 9/2009 | Philyaw et al. |
| 2010/0128921 | A1 | 5/2010 | Alattar et al. |
| 2011/0231240 | A1 | 9/2011 | Schoen et al. |
| 2011/0290882 | A1 | 12/2011 | Gu et al. |
| 2012/0016678 | A1 | 1/2012 | Gruber et al. |
| 2012/0206648 | A1 | 8/2012 | Casagrande et al. |
| 2012/0256732 | A1 | 10/2012 | McAllister |
| 2012/0278465 | A1 | 11/2012 | Johnson |
| 2013/0112760 | A1 | 5/2013 | Schory et al. |
| 2013/0197992 | A1 | 8/2013 | Bao |
| 2013/0215475 | A1 | 8/2013 | Noguchi |
| 2013/0228624 | A1 | 9/2013 | Byrd et al. |
| 2013/0297430 | A1 | 11/2013 | Soergel |
| 2014/0001253 | A1 | 1/2014 | Smith |
| 2014/0095461 | A1 | 4/2014 | Burt |
| 2015/0006702 | A1 | 1/2015 | Lakes et al. |
| 2015/0014417 | A1 | 1/2015 | Finlow-Bates et al. |
| 2015/0048169 | A1 | 2/2015 | Doberschutz |
| 2015/0099946 | A1 | 4/2015 | Sahin |
| 2015/0262221 | A1* | 9/2015 | Nakano ............ G06Q 30/0275 705/14.45 |
| 2015/0324678 | A1 | 11/2015 | Simske et al. |
| 2016/0063129 | A1 | 3/2016 | Lim et al. |
| 2016/0148083 | A1 | 5/2016 | Osborne et al. |
| 2016/0162767 | A1 | 6/2016 | Ito et al. |
| 2016/0189016 | A1 | 6/2016 | Windmueller et al. |
| 2016/0247423 | A1 | 8/2016 | Hohl et al. |
| 2016/0364825 | A1 | 12/2016 | Pan |
| 2017/0264608 | A1 | 9/2017 | Moore et al. |
| 2017/0300854 | A1 | 10/2017 | Harcar et al. |
| 2018/0365330 | A1 | 12/2018 | Lin et al. |
| 2019/0089757 | A1 | 3/2019 | Sorensen et al. |
| 2019/0138721 | A1 | 5/2019 | Wojnowicz et al. |
| 2019/0221293 | A1 | 7/2019 | Zhang |
| 2019/0234975 | A1 | 8/2019 | Pothini et al. |
| 2019/0258814 | A1 | 8/2019 | Heeter |
| 2019/0281030 | A1 | 9/2019 | Isaacson et al. |
| 2019/0281124 | A1 | 9/2019 | Lim et al. |
| 2020/0356080 | A1 | 11/2020 | Principato |
| 2020/0356083 | A1 | 11/2020 | Principato |
| 2020/0356741 | A1 | 11/2020 | Principato |
| 2020/0394699 | A1 | 12/2020 | Mueller |
| 2021/0042730 | A1 | 2/2021 | Lee |
| 2021/0271803 | A1 | 9/2021 | Seymour et al. |
| 2021/0287202 | A1 | 9/2021 | Fowler et al. |
| 2021/0334490 | A1 | 10/2021 | Luk et al. |
| 2021/0357715 | A1 | 11/2021 | Schimke et al. |
| 2022/0215190 | A1 | 7/2022 | Cohen et al. |
| 2022/0253811 | A1 | 8/2022 | Fowler et al. |
| 2022/0374664 | A1 | 11/2022 | Zhou et al. |

OTHER PUBLICATIONS

Jeremy Sacramento, "B2B go-to-market Benchmarks 2022," Dreamdata, Retrieved on Jan. 15, 2023.
"What is a Conversion Rate?" Optimizely, Inc., Retrieved on Jan. 18, 2023.
"Exit Rate V. Bounce Rate—at a Glance," https://support.google.com/analytics/answer/2525491?hl=en#:~:text=At%20a%20glance&text=For%20all%20pageviews%20to%20the,that%20start%20with%20that%20page., Retrieved on Jan. 25, 2023.
Bill Slawski, "Facebook Patent Application Describes Receiving Data from Logged-out Users to Target Ads," SEO by the Sea, Sep. 27, 2011.
"QR code statistics 2023: Latest Nos. and use-cases on global usage," QRTiger, Jan. 2, 2023.
"Redirecting Visitors Based on Dynamic Conditions," https://www.if-so.com/help/documentation/redirect-users-based-on-conditions/, Retrieved on Nov. 29, 2022.
Margaret Rouse, "Web Programming," https://www.techopedia.com/definition/23898/web-programming#:~:text=Web%20programming%20refers%20to%20the,server%20scripting%20and%20network%20security., May 13, 2020.
Allie Decker, "The Beginner's Guide to Website Development," https://blog.hubspot.com/website/website-development, May 5, 2022.
"Universally Unique Identifier," https://en.wikipedia.org/wiki/Universally_unique_identifier, Wikimedia Foundation, Inc., Nov. 15, 2022.
"UTMs: What They Are and How to Use Them the Right Way," https://metricswatch.com/utms-what-they-are-and-how-to-use-them-the-right-way, Retrieved on Nov. 30, 2022.
"What Are Tracking Pixels and How do They Work?" https://en.ryte.com/wiki/Tracking_Pixel#:~:text=A%20tracking%20pixel%20is%20an,web%20analysis%20or%20email%20marketing., Retrieved on Jan. 12, 2023.
Inderscience Enterprises Ltd., Wickramasinghe et al., "A Mathematical Model for Computational Aesthetics," pp. 310-324, 2010, Int. J. Computational Vision and Robotics, vol. 1, No. 3.
Elsevier, Maity et al., "A Computational Model to Predict Aesthetic Quality of Text Elements of GUI," pp. 152-159, 2016, Procedia Computer Science 84 (2016), www.sciencedirect.com.
AI Shack, Utkarsh Sinha, "Scanning QR Codes," 2010, https://aishack.in/tutorials/scanning-qr-codes-1/.
AIA Vision Online, "The Most Common Causes of Unreadable Barcodes," Apr. 15, 2015, https://www.visiononline.org/vision-resources-details.cfm?/content_id=5404.
Workwithcolor.com, "Color Properties/Terminology," Retrieved on Jun. 8, 2020, http://www.workwithcolor.com/color-properties-definitions-0101.htm.
The Eurographics Association, Florian Hoenig, "Defining Computational Aesthetics," 2005, Computational Aesthetics in Graphics, Visualization and Imaging (2005), www.diglib.eg.org.
DataGenetics, "Wounded QR Codes," Nov. 2013, http://datagenetics.com/blog/november12013/index.html.
QR Code Monkey, "6 Reasons Why Your QR Code Is Not Working," Retrieved on Jun. 9, 2020, https://www.qrcode-monkey.com/6-reasons-why-your-qr-code-is-not-working.
TechSpot, Inc., Mark Turner, "QR Codes Explained," Sep. 3, 2018, https://www.techspot.com/guides/1676-qr-code-explained/.
Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.
Thonky.com, "Module Placement in Matrix," Retrieved on Jun. 8, 2020, https://www.thonky.com/qr-code-tutorial/module-placement-matrix.
Keyence Corporation of America, "What Is a QR Code," Retrieved on Jun. 8, 2020, https://www.keyence.com/ss/products/auto_id/barcode_lecture/basic_2d/qr/.
Wikimedia Foundation, Inc., "QR Code," Retrieved on Jun. 3, 2020, https://en.wikipedia.org/wiki/QR_code.
Wikimedia Foundation, Inc., Walter Tuveli, "QR Code—Structure," 2012, https://en.wikipedia.org/wiki/QR_code#/media/File:QRCode-2-Strcture.png.

(56) References Cited

OTHER PUBLICATIONS

Wikimedia Foundation, Inc., "ShotCode," Retrieved on Aug. 6, 2021, https://en.wikipedia.org/wiki/ShotCode#searchInput.

Medium.com, Punit Pathak, "ETL—Understanding It and Effectively Using It," Jan. 7, 2019, https://medium.com/hashmapinc/etl-understanding-it-and-effectively-using-it-f827a5b3e54d.

Strathmore University (Nairobi, Kenya), Kizi Dimira Othuon, "Improving Customer Experience Using an Android Barcode Reader Application," Apr. 2018, https://su-plus.strathmore.edu/bitstream/handle/11071/5978/Improving%20customer%20shopping%20experience%20using%20an%20Android%20barcode%20reader%20application.pdf?sequence=1&isAllowed=y.

Westboroughtv.org, Horrigan, Aidan, "Mr. WHS 2020," Jun. 12, 2020, https://westboroughtv.org/mr-whs-2020-2/.

Facebook.com, Wa, Izakaya, "QR codes for the dinner menu and lunch menu at Memorial!" Jul. 24, 2020, https://m.facebook.com/196433773873837/posts/qr-codes-for-the-dinner-menu-and-lunch-menu-at-memorial.1730306280486571.

Ispot.tv, "StockX TV Spot, 'Flowcode: Never Sold Out,'" Mar. 27, 2020, https://www.ispot.tv/ad/nVly/stockx-flowcode-never-sold-out.

Nyp.org, "#FitForTheFrontline Challenge Unites Nation's Top Medical Centers to Support Frontline Healthcare Workers," May 28, 2020, https://www.nvp.org/news/fit-for-the-frontline-challenge.

\* cited by examiner

| Mobile Device Action | URL | Unique Identifier | Conversion Flag | Scan Event Details |
|---|---|---|---|---|
| Scan | flowcode.com/plans | | | |
| Browse | flowcode.com/plans/?fce_id=a73b6a6d-f473-4945-a672-94ea645ed43c | id=a73b6a6d-f473-4945-a672-94ea645ed43c | | |
| Conversion Event | flowcode.com/account?billing=1/?fce_id=a73b6a6d-f473-4945-a672-94ea645ed43c | id=a73b6a6d-f473-4945-a672-94ea645ed43c | | |

FIG. 6A

OFFLINE TO ONLINE CONVERSION LINKAGE

FIELD OF TECHNOLOGY

This disclosure relates to electronically linking offline user activity to online activity of that user.

BACKGROUND

A machine-readable label ("MRL") may include Quick Response ("QR") codes, Aztec codes, ShotCodes, SPARQCodes and any other suitable two-dimensional matrix barcodes. MRLs may include one-dimensional (e.g., linear) or three-dimensional machine-readable codes. MRLs provide businesses with a fast and efficient medium for connecting with consumers. Instructions may be encoded in an MRL. The instructions may include a uniform resource locator ("URL"), contact information or any other information. A scanning device is needed to scan and interpret the instructions encoded in an MRL.

When a scanning device reads or scans the MRL, the scanning device may extract the information encoded in the MRL. For example, the scanning device may be directed to the URL encoded in the MRL. Businesses may wish to leverage a MRL to guide consumers to a desired destination (real or virtual) where the customers can access products, services and information provided by the business.

In 2010, 62.6 million people in the United States used smartphones. During the 2020's, that number is predicted to more than quadruple to 272.6 million. Commensurate with increased smartphone use is integration of technology into smartphones that automates scanning and interpretation of an MRL. Today, many smartphones include a native camera application that recognizes MRLs such as QR codes. There is no need to download and install a separate application or use a specialized scanning device to scan an MRL and extract the encoded information.

MRLs potentially offer an inexpensive and efficient means of providing consumers with easy access to products, services or information. Consumers are already using their smartphones to search for information about a product/service of interest. Now, businesses can tap into this tendency by using MRLs to guide consumers to targeted content associated with a product/service. Furthermore, MRLs are inexpensive and easy to print on a variety of surfaces such as business cards, product packaging, posters, stickers or any suitable marketing materials.

In line with the aforementioned technological advances, MRL usage increased from 21% in 2013 to 34% in 2017 and has continued to increase. For example, coupons redeemed using QR codes quadrupled from 1.3 billion in 2017 to 5.3 billion in 2019 and in the US alone, 11 million households scanned a MRL in 2020. Despite the proliferation of mobile devices and other technological advances that have stimulated increased MRL usage, MRLs still suffer from disadvantages associated with conventional print-based media.

For example, MRLs are reliably scannable when the MRL is printed on a physical, tangible medium. Therefore, like traditional print-based mediums, it is difficult to determine which MRLs are being scanned and where those MRL were presented when scanned. Conventionally, there is no technological way to determine which billboard or advertisement motivated a user to purchase a product or service. Likewise, even if a user scans a MRL presented on billboard or advertisement, it remains technically challenging to link the scan of the MRL to any eventual action taken by the user subsequent to the scan. It would be desirable to provide a technological solution that links a display of an MRL on a physical location to user activity after scanning the MRL.

Even when an MRL is displayed within digital media or on electronic screens, the MRL is passive, and the user does not interact with the MRL. The user simply extracts information from the MRL and then consumes the extracted information. The MRL does not capture a response from the user and does not itself record how many times it has been scanned. Currently, there is no solution for linking a scanned MRL to subsequent action of the user after consuming the information extracted from the MRL. Accordingly, it would be desirable to provide apparatus and methods for OFFLINE TO ONLINE CONVERSION LINKAGE.

BRIEF DESCRIPTION OF THE DRAWINGS

The objects and advantages of this disclosure will be apparent upon consideration of the following disclosure, taken in conjunction with the accompanying drawings, in which like reference characters refer to like parts throughout, and in which:

FIG. 6A shows illustrative operation of a software tool in accordance with principles of the disclosure;

DETAILED DESCRIPTION

Figure 1:
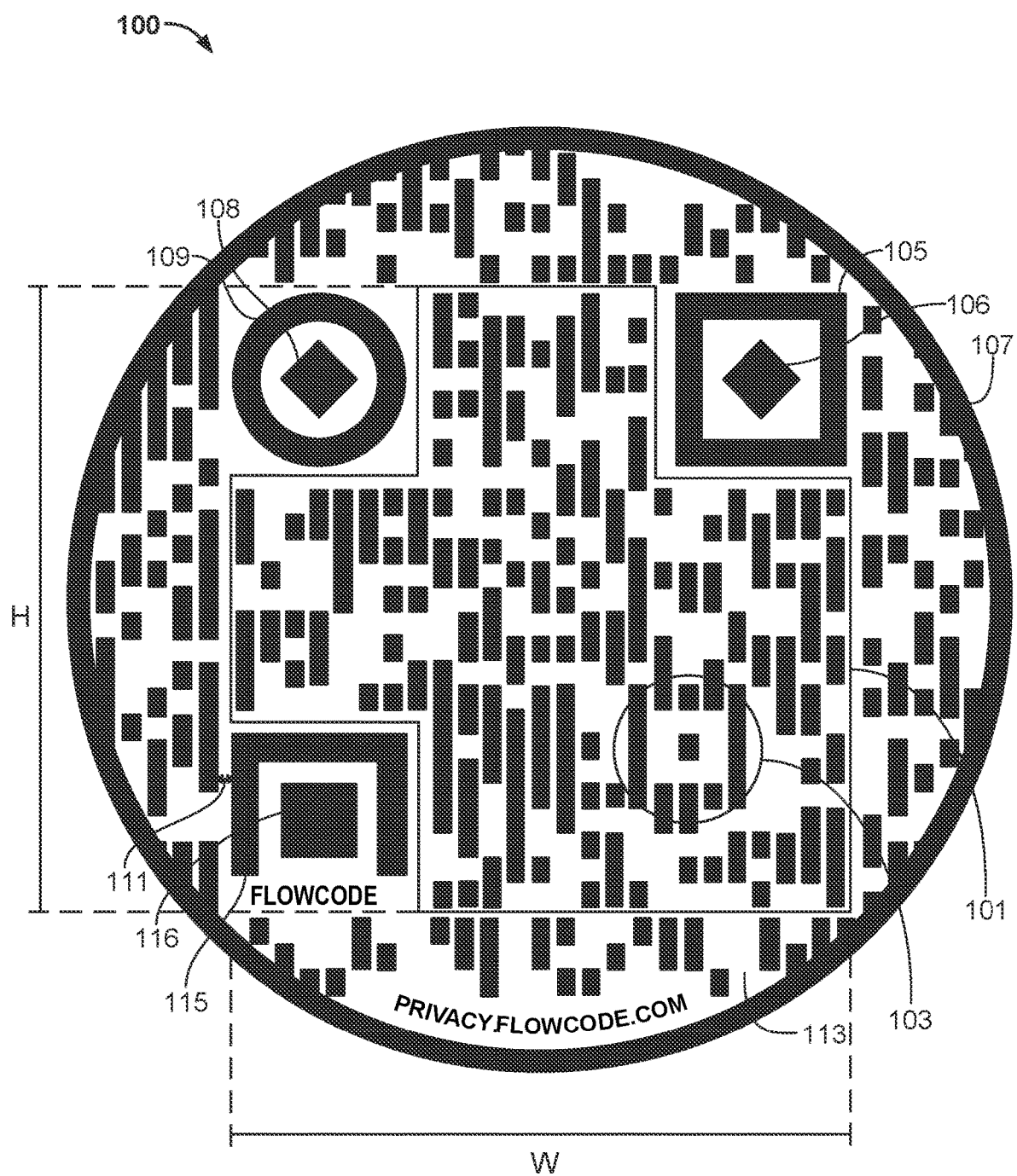
FIG. 1 shows an illustrative machine-readable label in accordance with principles of the disclosure.

Information encoded in a MRL may be captured optically, using a camera of a scanning device. The information encoded in an MRL may be captured in any suitable manner. Methods may include using any suitable technology or protocol for capturing information encoded in an MRL. For example, the encoded information may be captured using near field communication ("NFC"), Bluetooth or 5G communication between the MRL and a scanning device. Any suitable technology or method for capturing information encoded in a MRL may be referred to herein as a "scan" of the MRL.

A device that captures information encoded in a MRL may be referred to herein as a "scanning device." An illustrative scanning device may be a laptop, tablet, smartphone, other "smart" devices or any other suitable device for capturing, receiving, storing, transmitting and/or displaying electronic information.

An exemplary MRL may include a plurality of modules. A module may be a dark module or a light module. A scanning device, such as a smartphone, may be configured to interpret instructions encoded by a pattern of light and dark modules. For example, the scanning device may interpret the pattern of modules as a binary encoded message. A light module may represent a 0, and a dark module may represent a 1. A dark module may represent a 0, and a light module may represent a 1.

Modules within an MRL may define a data zone, a position detection pattern, a timing pattern, an error correction level and error correction code. Exemplary design choices (e.g., shapes, colors, color gradients and shading) may be applied to one or more modules of a data zone. The data zone may include machine readable instructions that, when scanned by a scanning device, trigger an action on the scanning device. For example, the data zone may encode instructions for launching a webpage or text message application. The instructions encoded in the data zone may prefill a destination field of the text message or insert text into the body of a message. The instructions encoded in the data zone may trigger a display of information on the scanning device such as a product identifier or instructions on how to use the product. The more information included within the data zone, the more modules will be needed to encode that information (e.g., a higher density data zone).

Exemplary design choices (e.g., shapes, colors, color gradients and shading) may be applied to one or more modules of an environmental zone of the MRL. The environmental zone of a MRL may include marks or designs that are not intended to be interpreted by a scanning device. The environmental zone may provide an MRL with a unique aesthetic appearance. However, even an MRL having a unique aesthetic appearance may conform to one or more standards published by the International Organization for Standardization (ISO) of Geneva, Switzerland. Illustrative standards published by the ISO include ISO/IEC 18004: 2015 and ISO/IEC 24778:2008 which are hereby incorporated herein by reference in their entireties.

Exemplary design choices (e.g., shapes, colors, color gradients and shading) may be applied to one or more modules of a position detection pattern of the MRL. A position detection pattern may include one or more modules that define a position marker (an "eye") of an MRL. The position marker may include modules arranged in a specific formation. A MRL may include position markers at one or more corners of the data zone. A MRL may include position markers at one or more borders of the data zone.

A scanning device may locate the data zone by detecting the position markers. A position marker is designed to include an arrangement of modules unlikely to appear elsewhere within other zones of an MRL. Illustrative design choices for each position marker included in a position detection pattern may include:

- a color of light modules included in the position marker;
- a shape defined by light modules included in the position marker;
- a shape defined by an outer border of dark modules of the position marker;
- a shape defined by dark modules within the outer border of the position marker;
- a color of dark modules that define the position marker;
- a color gradient applied to modules included in the position marker; and/or
- image(s) or logo(s) displayed within the position marker.

A position detection pattern may include one or more alignment markers. An alignment marker may allow a scanning device to locate the data zone despite displacement of the MRL relative to the scanning device, such as when the MRL is bent or curved. A position detection pattern may include one or more modules that define a timing pattern of the MRL. A timing pattern may include alternating dark and light modules. Timing patterns enable a scanning device to determine dimensions of a single module within the data zone. The arrangement of modules within the timing pattern enables a device scanning the MRL to follow a sequence for reading the executable instructions encoded in the data zone.

Exemplary design choices may include animations such as an animated graphics interchange file ("GIF"). An animation may be integrated into an image file of an MRL. An animation may be applied to specific modules of an MRL. For example, an animation may be applied to a border of the MRL (e.g., environmental zone). An animation may be applied to a data zone of the MRL or any other component of an MRL. An animation may be applied to an MRL for a defined duration of time. An MRL may be reliably scannable even after being integrated with an animation.

Methods for computationally linking offline action of a user to online action of the user is provided. Methods may include extracting machine-readable instructions stored on a non-transitory memory. Methods may include executing the machine-readable instructions on one or more processors. The executing of the machine-readable instructions on the processor may cause the one or more processors to perform one or more steps of the methods.

Methods may include detecting a scan of a machine-readable label ("MRL"). The scan may be associated with a target location. The MRL may be positioned in the target location. The target location may be a geographic location. For example, the MRL may be printed and affixed to real property or other tangible surfaces. The MRL may be displayed on a screen at the target location. The target location may be a region that includes display of the MRL. The region may be defined by a zip code, or by a distance from a target location or landmark.

An MRL may be positioned at a fixed location or on a specific object (e.g., a bicycle, hat, shirt, car). The target location may be a virtual location. For example, the target location may be a position of the MRL within a video file or in the metaverse. The target location may be a display location of an MRL included in virtual reality ("VR") or augmented reality ("AR") content. The target location may be a location where an MRL is presented holographically or projected onto a surface. The target location may be a location where a scanning device captures information encoded in the MRL. For example, in connection with scanning the MRL, the scanning device may capture a GPS location or latitude/longitude coordinates or utilize signal triangulation techniques to determine the target location.

In response to the scan of the MRL, methods may include generating a redirect uniform resource locator ("URL"). The scan of the MRL may extract a default URL from the MRL. The default URL may connect the scanning device to a redirect service. The scanning device may submit a request to the redirect service for the redirect URL. The redirect service may be a software application resident on the scanning device. The redirect service may be a cloud-based application hosted on a remote computer system. U.S. Pat. No. 11,120,095 titled "Refactoring of Static Machine-Readable Codes" issued on Sep. 14, 2021 and incorporated by reference herein describes apparatus and methods for an illustrative redirect service.

The redirect URL may direct the scanning device to custom content. The redirect service may determine the redirect URL provided to the scanning device based on one or more scan event details captured in connection with the scan of the MRL. Illustrative scan event details may include a scan time, geographic location of scanned MRL or scanning device, identity of scanning device, software running on the scanning device, manufacturer of the scanning device, creator of the scanned MRL, weather at time of scan or other information that may be correlated to the scan of the MRL. Scan event details may be captured by a cookie resident on a browser of the scanning device. Scan event details may be captured by the redirect service.

Methods may include incorporating a unique identifier into the redirect URL. In some embodiments, the unique identifier may be encoded in the scanned MRL. The unique identifier may be extracted by the scanning device from a data zone or environmental zone of the scanned MRL. The first unique identifier may be a key or index value that links information stored in a database record to the scanned MRL. The unique identifier may be included in the default URL extracted by the scanning device.

In some embodiments, methods may include generating the unique identifier in response to the scan of the MRL. For example, the unique identifier may be generated by the redirect service. The unique identifier may be a key or index value associated with the scanned MRL, the target location or any other scan event details. The unique identifier may be a key or index value that will link information stored in a database record to the scanned MRL.

An illustrative unique identifier may be a 128-bit label, as defined in ISO/IEC 11578 and ISO/IEC 9834-8. For example, an illustrative unique identifier may include 32 hexadecimal (base-16) digits in five groups separated by hyphens in the form 8-4-4-4-12 for a total of 36 characters (32 hexadecimal characters and 4 hyphens). An illustrative unique identifier may be: 123e4567-e89b-12d3-a456-426614174000.

Methods may include persisting the unique identifier while the user browses a target website accessed using the redirect URL. Persisting the unique identifier may include appending the unique identifier to any URL that is used to access a page of the target website.

Programming within the target website may be configured to ensure that the unique identifier is included in each webpage URL as the user browses the target website. Programming within the target website may refer to any coding involved in web development. For example, programming may include front-end development and back-end development. Front-end development may include computer code that allows users to interact with a website—such as playing videos, expanding or minimizing images or highlighting text. Back-end development may include computer code for data retrieval, security and performance associated with the website. Back-end development may configure systems like servers, operating systems, APIs, and databases that support security and content associated with a website. Common computer languages used for web programming include XML, HTML, Go, JavaScript, Perl 5 and PHP ASP, PHP, Java and MySQL.

Methods may include detecting a conversion event on the target website. A conversion event may be any desirable action of a user on the target website. An illustrative conversion event may include the purchase of a product/service via the target website. Illustrative conversion events may include capturing an email address or other information submitted by a user or an NFT download.

Conversion events may be tracked and may provide indicators of online website performance. Using the unique identifier, the online performance of the target website may be linked to the offline scan of the MRL. Any user action on the target website may be classified as a conversion event. For example, the web programming may be configured to detect when a user scrolls through more than 50% of content presented on a webpage.

Other illustrative conversion events may include user completion of forms, registrations for information or requests for demonstrations. Illustrative conversion events may include views of products and pricing webpages. Customers who are getting ready to purchase a product or service may visit the product and pricing webpages to learn more details about products, services and associated costs. Higher activity on these webpages may be used to measure the effectiveness of marketing efforts.

An illustrative conversion event may include a "bounce rate" associated with the target website. The bounce rate may refer to the percentage of visitors that access the target website and leave after viewing one webpage. The target website's bounce rate may indicate whether content presented on a landing page of the target website is engaging and relevant.

An illustrative conversion event may include an "exit rate" for a webpage. The webpage's exit rate may refer to a percentage of visitors who view a webpage and then exit or leave the target website from the webpage. As opposed to the bounce rate, the exit rate may track visitors that leave or exit the target website after viewing two or more webpages. The bounce rate is determined based on visitors that only view a single webpage and then exit or leave the target website.

In response to detecting a conversion event on the target website, methods may include linking the conversion event to the scan of the MRL. The conversion event may be linked to the scan of the MRL via the unique identifier. The redirect service may assign the unique identifier and incorporate the unique identifier into a redirect URL generated by the redirect service. The scanning device may be programmed to store the unique identifier locally on the scanning device. For example, an application running on the scanning device may interact with the redirect service and detect that the redirect service has generated the unique identifier.

Using the redirect URL, the scanning device may navigate to the target website. The target website may include a pixel or other web programming that extracts the unique identifier from the redirect URL. The target website may include web programming that extracts the unique identifier from a hypertext transfer protocol ("HTTP") request header. However, HTTP request headers may be modified or removed by intermediate servers or browsers.

The pixel is loaded when a user visits the target website. The pixel is designed to be transparent or camouflaged in the background color of the target website so that it does not stand out to users. The pixel may include computer code that is loaded when the user's browser downloads the pixel.

The pixel may include an external link to a remote server. The computer code is processed by the user's browser which follows the link and opens the (invisible) graphic. This event is registered and noted in the target website's log files. In addition, other information about the user may also be captured. For example, the pixel may be used to acquire the following illustrative informational items:

Operating system (may indicate a mobile device)
    Where target website is being viewed (on mobile or desktop device)
    Type of program used to view target website (web browser)
    User's screen resolution Time website was visited Activities conducted by the user on the target website User location (IP address)

The pixel may extract the unique identifier from the redirect URL. The pixel may store the unique identifier in a record that includes the redirect URL and the unique identifier. The pixel may also detect a conversion event. The pixel may also detect a presence of the unique identifier in the page URL of the webpage that hosted the conversion event. The pixel may locate the record that includes the unique identifier and store the conversion event in the record. The redirect service may access the data record created by the pixel. In response to detecting a conversion event associated with a unique identifier, the redirect service may determine which scanned MRL triggered generation of the unique identifier. Thus, the scan of the MRL may be linked to the conversion event on the target webpage.

In response to detecting a conversion event on the target website, methods may include linking the conversion event to the target location of the MRL. One or more scan event details captured by the redirect service may include a location of the MRL. The location of the scanned MRL may be associated with the unique identifier generated in response to the scan of the MRL at the location. The unique identifier may be associated with the location of the MRL and a conversion event (e.g., captured by a pixel) on the target website.

Based on the linking of the conversion event to a location of a scanned MRL, methods may include dynamically changing a target location of the MRL. For example, the MRL may be presented at a first target location. The first target location may include a time the MRL is presented within a video file or a media channel that distributes the video file. The first target location may include a physical location such as a building, billboard, shop window or moveable signage.

Based on detecting one or more conversion events associated with the MRL, methods may include moving the MRL from the first target location to a second target location. For example, methods may include changing a time when the MRL is viewable during playback of an electronic file. Methods may include changing a viewable position at which the MRL is presented during playback of an electronic file.

Methods may include determining that, when scanned at the second location, the MRL may be associated with more conversion events than when scanned at the first location. Based detecting one or more conversion events associated with the MRL, methods may include formulating a different redirect URL for the MRL. The different redirect URL may direct scanning users to content that is more likely to lead to a conversion event.

The second location may be identified based on one or more performance metrics associated with the scanned MRL. Illustrative performance metrics may include conversation events and other benchmarks for measuring return on investment ("ROI") for the MRL. Illustrative performance metrics may include scan rate, target webpage impressions, cost-per-scan and conversion percentage or ratio associated with the MRL. Methods may include using machine learning or other forms of artificial intelligence to determine the second target location that will improve the ROI associated with the MRL.

Illustrative machine learning that may be employed by the redirect service include AdaBoost, Naive Bayes, Support Vector Machine, Random Forests, Artificial Neural Networks, Deep Neural Networks and Convolutional Neural Networks. The machine learning or other forms of artificial intelligence may be applied by the redirect service or by web programming associated with the target website.

The user that scans the MRL may be a first user, the scan of the MRL may be a first scan by the first user, the unique identifier may be a first unique identifier and the conversion event may be a first conversion event. Methods may include detecting a second scan of the MRL by a second user. Methods may include associating a second unique identifier with the second scan of the MRL. Methods may include linking a second conversion event on the target website to the second scan.

A first MRL may be associated with a first unique identifier. The data zone of the first MRL may encode the first unique identifier. The redirect service may generate the first unique identifier. A second MRL may be associated with a second unique identifier. The data zone of the second MRL may encode the second unique identifier. The redirect service may generate the second unique identifier. The first MRL and the second MRL may encode the same default URL in their data zones.

For example, the data zone of a first MRL may encode the following information: www.Default_Scan_Destination.com/?fce_id=123. The segment "www.Default_Scan_Destination.com" may correspond to a default URL. The segment "123" may be a first unique identifier.

The data zone of a second MRL may encode the following information: www.Default_Scan_Destination.com/?fce_id=456. The segment "www.Default_Scan_Destination.com" may correspond to the default URL and "456" may be a second unique identifier.

In some embodiments, the first and second MRLs may encode the same unique identifier in their data zones. The unique identifier may be associated with the default URL encoded in the data zones. The first and second MRLs may be associated with conversion events of multiple users that scan the first and second MRLs. The conversion events may not be associated with a specific MRL, but rather with a plurality of MRLs that redirect users to the target website or other content.

In some embodiments, the target location of a first MRL may be a first target location. The first MRL may encode a default URL or other information. Other MRLs that each encode the same default URL or other information as the first MRL may be positioned at other target locations. The first MRL may encode a unique identifier. Methods may include capturing information the default URL or other information from a data zone of a second MRL. The second MRL may be positioned at a second target location.

In response to capturing the information encoded in the first MRL, methods may include generating a redirect URL and a first unique identifier. In response to capturing the information encoded in the second MRL, methods may include generating the same redirect URL as generated for the first MRL and a second unique identifier. Methods may include linking a second conversion event on the target website to the default URL or other information encoded in both the first and second data zones. The default URL may link the two unique identifiers and any conversion events associated with those two unique identifiers. The default URL may link the first target location of the first MRL to the second target location of the second MRL.

In addition to positioning location, the first MRL may differ in other ways from the second MRL. For example, the first MRL may include a different color from the second MRL. The first MRL may encode information in modules outside the data zone that is different from or not included in the second MRL.

Methods may include detecting a scan of an MRL at a target time. Methods may include linking a conversion event to the MRL at least 24 hours after the target time. The unique identifier generated in response to scanning the MRL may be stored in a local storage location associated with the scanning device. For example, the unique identifier may be stored in a memory location associated with a browser installed on the scanning device.

The unique identifier generated in response to scanning the MRL may be stored in session storage, or cookie storage location associated with the scanning device. As opposed to other local storage locations on the scanning device, session storage locations may be cleared when a webpage or browsing session ends, and cookies storge locations may be cleared after an expiration date associated with the cookie.

When the scanning device accesses the target website, a pixel included in the target website may check for a unique identifier stored in the memory location on the scanning device. The pixel may check for the unique identifier irrespective of whether the scanning device has accessed the target website using a redirect URL. In any case, if the pixel detects the unique identifier stored on the scanning device, any subsequent conversion event detected on the target website may be linked to an earlier-in-time scan of an MRL that triggered generation of the unique identifier stored on the scanning device.

In some embodiments, the pixel may detect and identify a scanning device. For example, after scanning an MRL, the scanning device may be directed to the redirect service. The scanning device may transmit scan event details to the redirect service. Illustrative scan event details may include a scan time, a scan location and identification of the scanning device. A scanning device may be identified based on SIM card data, IP address, a media access control address or an international mobile equipment identity of the scanning device.

The redirect service may pass identification of the scanning device to the pixel on the target website. The pixel may store the identification of the scanning device in a database record that includes the unique identifier generated in response to an MRL scan. When the scanning device returns to the target website at a later time, the pixel may link the scanning device to the database record that includes the unique identifier. The pixel may link a conversion event at the later time to the scanning device and the unique identifier associated therewith.

Methods may include detecting a first scan of a first MRL. The first scan may be associated with a unique identifier. Methods may include detecting a second scan of a second MRL. Methods may include linking the second scan of the second MRL to the unique identifier associated with a first MRL. In response to detecting a conversion event on the target website associated with the unique identifier, methods may include linking the detected conversion event to the first scan of the first MRL and to the second scan of the second MRL. Methods may include linking the detected conversion event to a first location of the first MRL and a second location of the second MRL.

Linking the conversion event to the first and second MRLs may indicate that the conversion event is attributable to both the first and second MRLs. For example, the method may include redirecting scans of the first MRL and the second MRL to the same redirect URL associated with the target website. A potential customer may visit the target website multiple times over multiple months before purchasing a product, service or otherwise executing a conversion event. A customer of a European company may take on average 70% (82 days) longer to complete a purchase compared to a customer of a U.S. company.

A system architecture that links offline action of a user to online action of the user is provided. Linking offline to online activity provides real-time feedback on traffic flow from an MRL scan to a conversion event on a target website. Linking offline to online activity enables tracking of specific MRLs and conversion events associated therewith. Linking offline to online activity enables calculating benchmarks such as time from scan to a conversion event and best performing conversion locations for an MRL. Linking offline to online activity enhances security and data quality as each conversion event can be traced back to a unique MRL scan and a timestamp and geolocation associated with the unique MRL scan.

The architecture may include a machine-readable label ("MRL") that encodes machine-readable instructions. The architecture may include a scanning device. The scanning device may extract the machine-readable instructions from the MRL. The scanning device may access a redirect service using the machine-readable instructions. The redirect service may be a software application resident on a scanning device. The redirect service may be a cloud-based application hosted on a remote computer system. A default uniform resource locator ("URL") encoded in the scanned MRL may direct the scanning device to the remote computer system.

The redirect service may provide a redirect URL to the scanning device. The redirect service may generate a unique identifier and provide the unique identifier to the scanning device. The scanning device may store the unique identifier in a first location. The scanning device may access a target website using the redirect URL.

The target website may be further programmed to persist the unique identifier as the user navigates the target website accessed using the redirect URL. The target website may be programmed to detect a conversion event. In response to the conversion event, the target website may be programmed to store the unique identifier in a second location. In response to detecting the unique identifier in the first location and in the second location, the target website may be programmed to link the scanned MRL to the detected conversion event.

The target website may include a pixel or other computer code that captures activity of a user or device on the target website. The target website may be programmed to parse the redirect URL and extract the unique identifier. The target website may be programmed to store the unique identifier in the first location. The target website may be programmed to store the unique identifier in the second location.

The first location may be a memory location associated with a browser installed on the scanning device. The first location may be a memory location associated with the target website. The target website may store the unique identifier in the first location at a first time. The target website may store the unique identifier in the second location at a second time. The first time may be earlier than the second time. A time window between the first time and the second time may be at least a week.

The MRL may be positioned in a geographic location. The conversion event may be one of a plurality of conversion events that are linked to the MRL. Based on the plurality of conversion events, the redirect service may be configured to compute a conversion ratio of the target website for the MRL positioned in the geographic location.

A system architecture that links an offline action to an online action is provided. The architecture may include machine-readable instructions stored on a non-transitory memory. The machine-readable instructions may be executed by one or more processors of a computer system. The machine-readable instructions, when executed by the one or more processors, may cause the computer system to implement functionality dictated by the machine-readable instructions.

The processor may control the overall operation of the computer system and its associated components. The processor processes data and may include one or more processors. Illustrative processors may include microprocessors such as a central processing unit ("CPU"), a graphic processing unit ("GPU"), microcontrollers, or the like. The term processor may encompass all apparatus, devices, and machines for processing data, including by way of example a programmable processor, a computer, or multiple processors or computers. Some or all of the machine-readable instructions may be embodied in hardware or firmware. The hardware and firmware may include one or more circuit boards. In some embodiments, the circuit boards may be integrated into a single chip. The chip may be silicon-based.

Generally, machine-readable instructions may include routines, programs, objects, components, data structures, etc. that perform particular tasks or implement particular data types or structures. For example, machine-readable instructions may be a software application stored within non-transitory memory and/or other storage medium of a computer system. The non-transitory memory of the computer system may also store other software applications such as an operating system, application programs, and an associated database.

The computer system may support establishing network connections to one or more remote computers or networks. Illustrative network connections may include a local area network ("LAN"), a wide area network ("WAN") and may also include other networks. When used in a LAN networking environment, the computer system may connect to other systems on the LAN through a network interface or adapter. The computer system may support establishing communications over a WAN, such as the Internet. The existence of any of various well-known protocols such as TCP/IP, Ethernet, FTP, HTTP and the like is presumed, and the computer system may operate in a client-server configuration to permit retrieval of web pages from a web-based server. Web browsers (e.g., on a viewer or owner device) can be used to display and manipulate data on web pages.

Cloud computing and virtualization implementations of a computer system may be designed to run on a physical apparatus supplied externally by a hosting provider, a client, or other virtualized platform. The computer system may be operational with distributed computing environments where tasks are performed by remote processing devices that are linked through a communications network. In a distributed computing environment, program modules of the computer system may be located in both local and remote computer storage media including memory storage devices. The computer system may rely on a network of remote servers hosted on the internet to store, manage, and process data (e.g., "cloud computing" and/or "fog computing").

The computer system may include machine-readable instructions for invoking user functionality related to communication, such as email, short message service ("SMS"), and voice input and speech recognition applications. The computer system may utilize one or more algorithms or other software applications that generate MRLs based on design choices entered by a user or any other suitable tasks.

The system architecture may include an MRL generator. An illustrative MRL generator is described in U.S. Pat. No. 11,010,650, entitled "Machine-Readable Label Generator" and issued on May 18, 2021, which is hereby incorporated by reference herein in its entirety. The MRL generator may allow a user to customize the appearance of an MRL and content presented to a viewer that scans the MRL. The MRL generator may be programmed such that a custom library of design choices (e.g., images, colors and shapes), custom content options and restrictions are available to a user that uses the MRL generator to create an MRL. The MRL generator may be accessed by an application program interface.

The MRL generator may generate an MRL optimized for scan recognition when the generated MRL is displayed electronically, such as on a screen. The optimized copy of the generated MRL may encode a default scan destination. The default scan destination of the MRL may be linked to custom content. When the MRL is scanned, the linked custom content will be presented to a scanning viewer. Apparatus and methods for linking a MRL to custom content are described in U.S. Pat. No. 11,120,095, titled "Refactoring of Static Machine-Readable Codes" and issued on Sep. 14, 2021, which is hereby incorporated by reference herein in its entirety.

The computer system may capture and process data in different structures or communication formats. For example, the computer system may use different data structures to store captured data. The computer system may utilize different communication protocols to transmit captured data or communicate with other computer systems. Despite such operational differences, the computer system may be configured to operate substantially seamlessly with those other computer systems. Interoperability may allow a user to generate an MRL using a first computer system, scan the MRL using a second computer system, generate a redirect URL and unique identifier using a third computer system and utilize a fourth computer system to track conversion events.

The system architecture may include a machine-readable label ("MRL") that comprises a data zone. The system architecture may include a scanning device. The scanning device may be programmed, via machine-readable instructions, to register an offline action by reading the data zone of the MRL. Scanning the MRL may be considered an offline action because the scanning device and MRL do not interact with each other electronically. For example, the MRL may be scanned optically. Using information encoded in the data zone, the scanning device may access a redirect service. The scanning device may receive a redirect uniform resource locator ("URL") and a unique identifier generated by the redirect service.

The system architecture may include a target website. The redirect URL received from the redirect service may direct the scanning device to the target website. The redirect URL may include the unique identifier. When the scanning device accesses the target website using the redirect URL, the target website may include a pixel or other programming that extracts the unique identifier from the redirect URL and stores the unique identifier in a memory location.

The memory location may be local storage on the scanning device. The memory location may be local storage on a remote server hosting the target website or any other storage location associated with the target website. The memory location may be local storage on a remote server associated with the redirect service.

The target website may be further programmed to persist the unique identifier as the scanning device navigates from a first page of the target website identified by the redirect URL to a second page of the target website identified by a page URL. For example, the redirect URL may direct the scanning device to a landing or home page of the target website. The home page may be the first webpage. The scanning device may then access a link on the home page to navigate to a second webpage associated with the target website. The target website may be programmed to append the unique identifier to the page URL that directs the scanning device to the second webpage.

The target website may be programmed to detect that the scanning device has performed or triggered an online action on the second page of the target website. The online action may be a transaction that includes purchase of a product or service via the target website. The online action may be any suitable conversion event.

In response to the online action, the target website may be programmed to determine whether the page URL includes the unique identifier. In response to detecting the unique identifier in the memory location and in the page URL, the target website may be programmed to link the offline action and the online action. The presence of the unique identifier on the second page URL and stored in the memory location indicates that the scanning device was directed to the target website by scanning the MRL.

The memory location storing the unique identifier may be a first memory location. The first memory location may be local storage on the scanning device or associated with the redirect service. The first memory location may be local storage associated with the target website. In response to the online action, the target website may store the unique identifier in a second memory location. The second memory location may be local storage on a remote server hosting the target website or any other storage location associated with the target website. The second memory location may be local storage on the scanning device. The second memory location may be associated with the redirect service.

The offline action may be a first offline action, the unique identifier may be a first unique identifier, the scanning device may be a first scanning device, and the memory location may be a first memory location. The system architecture may include a second scanning device. The second scanning device may register a second offline action by reading the data zone. The data zone scanned by the first scanning device may be included in a first MRL. The data read by the second scanning device may be included in a second MRL. The first and second MRLs may include identical data zones. In some embodiments, the first and second MRLs may encode the same default URL.

Using information encoded in the data zone, the second scanning device may access the redirect service. For example, the second scanning device may extract a default URL encoded in the scanned data zone. The second scanning device may receive a redirect URL from the redirect service. The redirect URL may direct the second scanning device to the target website. The redirect service may also generate and provide a second unique identifier to the second scanning device.

The second scanning device may access the target website using the redirect URL. The target website may store the second unique identifier in a second memory location. The target website may persist the unique identifier as the second scanning device navigates from a first page of the target website identified by the redirect URL to a second page of the target website.

The target website may detect that the second scanning device triggers the online action on the second page of the target website. The online action may be a conversion event. In response to the online action, the target website may determine whether the page URL associated with the second page includes the second unique identifier. In response to detecting the second unique identifier in the second memory location and in the page URL of the second page, the target website may link the second offline action to the online action.

The target website may utilize a first pixel embedded in the first page to extract the unique identifier from the redirect URL. The target website may utilize a second pixel embedded in the second page to extract the unique identifier from the page URL.

In embodiments where the first scanning device scans the data zone of a first MRL and the second scanning device scans the data zone of the second MRL, the first MRL may be displayed at a first geographic location and the second MRL may be displayed at a second geographic location. The first MRL may be displayed within a first media stream and the second MRL may be displayed within a second media stream. In response to linking the first offline action of the first scanning device and the second offline action of the second scanning device to the online action, determining a position of a third MRL within a third media stream.

Apparatus and methods in accordance with this disclosure will now be described in connection with the figures, which form a part hereof. The figures show illustrative features of apparatus and methods in accordance with the principles of this disclosure. It is understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus described herein.

Apparatus embodiments may omit features shown and/or described in connection with illustrative apparatus. Apparatus embodiments may include features that are neither shown nor described in connection with illustrative apparatus. Features of illustrative apparatus embodiments may be combined. For example, an illustrative apparatus embodiment may include features shown or described in connection with any other illustrative apparatus and/or method embodiment described herein.

FIG. 1 shows illustrative machine-readable optical label 100. MRL 100 includes data zone 101. Data zone 101 includes light and dark modules that encode executable instructions. MRL 100 includes alignment marker 103. Alignment marker 103 is defined by an outer border that includes light and dark modules, an inner border of light modules and a dark module in the center.

MRL 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules.

Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

MRL 100 includes environmental zone 113. Environmental zone 113 includes modules that are not interpreted when MRL 100 is scanned. Environmental zone 113 may include all parts of MRL 100 outside of data zone 101. Environmental zone 113 has been constructed such that it has an appearance that, to a human eye, seems contiguous with the modules of data zone 101. Environmental zone 113 may be constructed such that it does not interfere with the scanning of data zone 101. Environmental zone 113 includes buffer 111. Buffer 111 includes light modules that space data zone 101 apart from modules of environmental zone 113. MRL 100 includes circular border 107. Border 107 may be included in environmental zone 113.

MRL 100 may be displayed on a screen. A viewer may scan MRL 100 using a scanning device such as a mobile device. Data zone 101 may encode any suitable information such as a uniform resource locator ("URL"), link to a social media profile, contact information associated with a business or other alphanumeric information. Data zone 101 may encode instructions, that when scanned, trigger the scanning device to perform a target action or function. The information encoded in data zone 101 may be captured or read by a native application or a third-party application running on the scanning device.

Data zone 101 may conform to an encoding specification for a Quick Response ("QR") code. MRLs described in connection with this disclosure may be any suitable scannable machine-readable code. Other illustrative machine-readable codes include any suitable linear or two-dimensional matrix barcodes, such as Aztec code, ShotCode, SPARQCode, and the like. Other illustrative machine-readable codes include any suitable one dimensional or three-dimensional machine-readable codes.

Data zone 101 may encode a set of instructions that may be repeatedly scanned by multiple viewers and/or scanning devices. For example, MRL 100 may be printed on multiple electronic tags. Each scan of MRL 100 may capture the identical information from data zone 101. Even though each scanning device may capture the same information from data zone 101, the particular content that is presented on a scanning device may be dynamically customized based on a scan location, scan time, scanning device type or any other suitable scan event detail.

Figure 2:
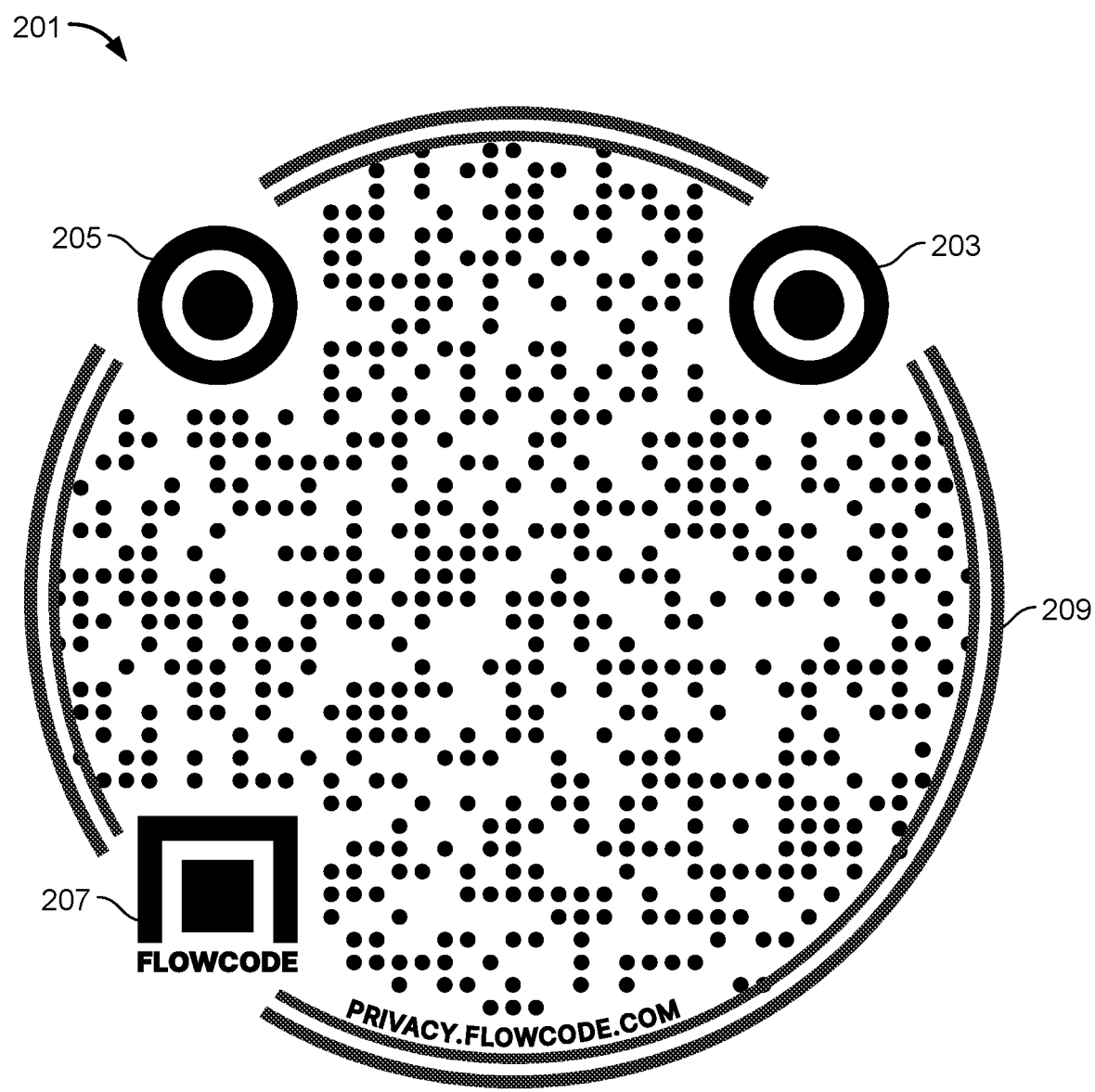
FIG. 2 shows an illustrative machine-readable label in accordance with principles of the disclosure.

FIG. 2 shows illustrative MRL 201. MRL 201 is optimized for scan recognition when displayed electronically. For example, when displayed electronically, MRL 201 may be reliably scannable by a greater number of scanning devices compared to MRL 100 (shown in FIG. 1). A benchmark level of scan reliability may be defined as capturing information encoded in a data zone of an MRL within a threshold time (e.g., ≤100 milliseconds) by a threshold number of scanning devices (e.g., Android and iOS devices). Electronically displaying MRL 201 may include presenting MRL 201 on a screen, using a light source, holographically or any other electronic presentation.

To optimize scan-ability when MRL 201 is presented electronically, outer border 209 includes breaks at position markers 203, 205 and 207. To optimize scan-ability when MRL 201 is presented electronically, one or more of position markers 203, 205 and 207 may protrude beyond outer border 209. MRL 201 may include a data zone that conforms to an encoding specification for a Quick Response ("QR") code or any other suitable linear or two-dimensional matrix barcodes, such as Aztec code, ShotCode, SPARQCode, and the like.

Figure 3:
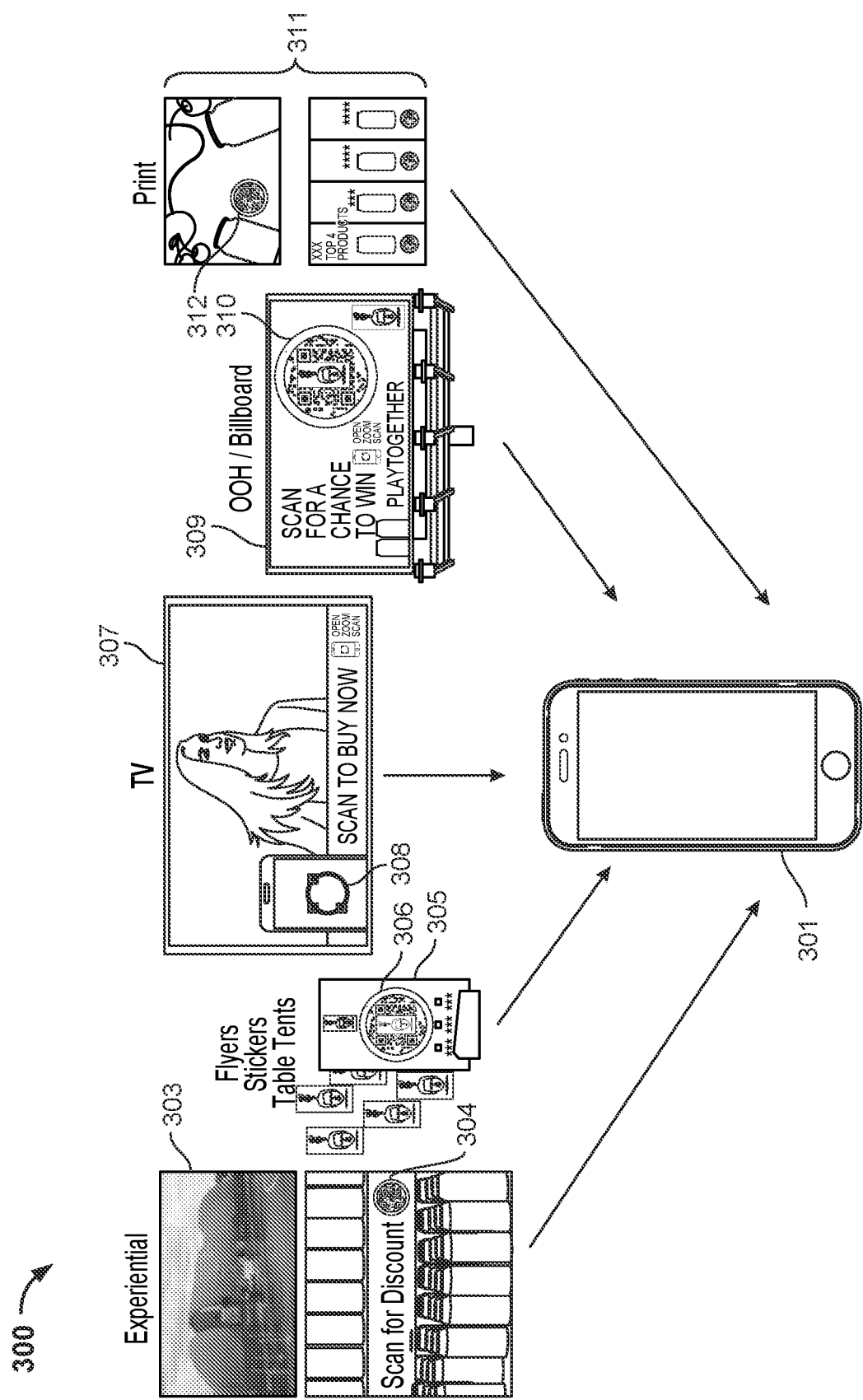
FIG. 3 shows an illustrative positioning of machine-readable labels in accordance with principles of the disclosure.

FIG. 3 shows illustrative MRLs that are positioned in different locations. Each of the MRLs shown in FIG. 3 may be scanned by scanning device 301. Illustrative locations shown in FIG. 3 include experiential events or items 303 which include MRL 304, flyers/stickers and table tents 305 which include MRL 306, digital media presentations 307 which include MRL 308, advertising items 309 which include MRL 310 and print media 311 which include MRL 312. In response to a scan of any of the MRLs in any of the locations shown in FIG. 3, scanning device 301 may extract a default URL from the scanned MRL. The default URL may redirect scanning device 301 to a redirect service.

The redirect service may generate a redirect URL that redirects scanning device 301 to a target website that provides information about or access to a service, goods or promotional items. The redirect service may also generate a unique identifier that can be used to link the scan of the MRL to activity on the target website. Linking the MRL scan to activity on the target website may allow formulation of performance metrics associated with the MRLs displayed at the different locations.

Illustrative performance metrics may include time users spend on the target website presented in response to an MRL scan, user engagement with content of service presented on the target website (interaction with a chatbot or add to cart or other activity) and utilization of the service, goods or promotional items available via the target website. Content presented on the scanning device in response to the MRL scan may be changed based on the captured performance metrics. For example, users may be directed to a specific landing page of the target website that is associated with target performance metrics.

Figure 4:
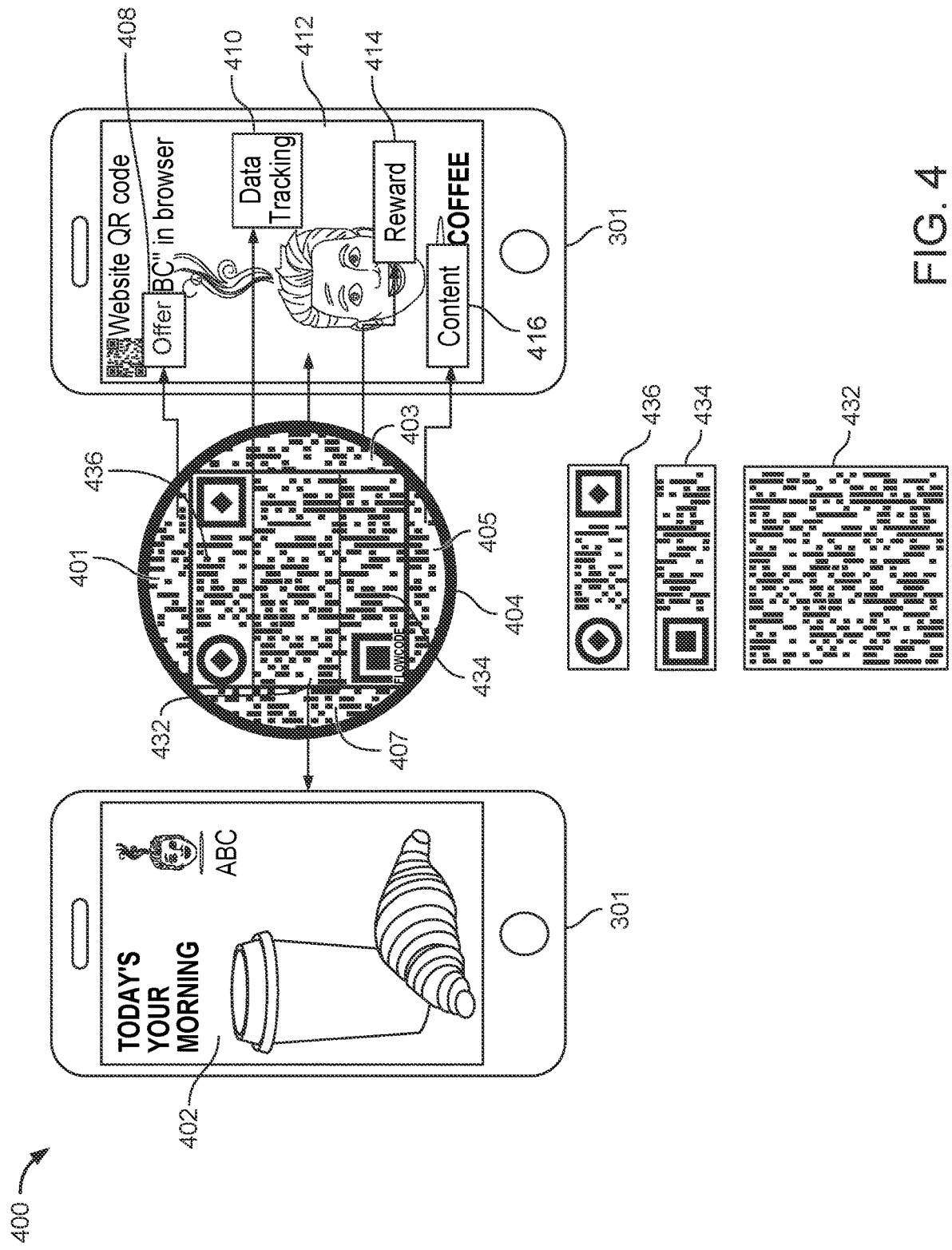
FIG. 4 shows illustrative components of a machine-readable label and an associated scenario in accordance with principles of the disclosure.

FIG. 4 shows how different code regions of MRL 100 (shown in FIG. 1) may be processed by illustrative scanning device 301. Scanning one or more code regions of MRL 100 may trigger a loading of webpage 412 on scanning device 301. Scanning one or more code regions of MRL 100 may trigger a loading of webpage 402 on scanning device 301. Webpage 402 and webpage 412 may both be part of a target website.

Code region 401 of MRL 100 may provide instructions related to offer 408 displayed when webpage 412 is presented on scanning device 301. Code region 403 may provide instructions related to reward 414 displayed when webpage 412 is presented on scanning device 301. Code region 405 may provide instructions related to content 416 displayed when webpage 412 is presented on scanning device 301.

Code region 407 may track user activity on webpage 412. Code region 407 may embed a tracking pixel or other code into webpage 412. Code region 407 may embed a tracking pixel, cookie or other code on scanning device 301. The tracking pixel or other code may capture activity of the user on webpage 412. Illustrative user activity may include a conversion event. The tracking pixel or other code may extract a unique identifier in a URL for webpage 412. User analytics and other performance metrics may be generated based on tracking user activity on webpage 412.

FIG. 4 also shows that scannable code regions of MRL 100 may include rim 404 and/or internal region 432. To the extent that internal region 432 is scannable independently of other code regions, when scanned alone, internal code region 432 may trigger a loading of webpage 402 or other content that is different from webpage 412.

FIG. 4 also shows that internal code region 432 may be subdivided into different scannable code regions. FIG. 4 shows that internal code region 432 includes code subregions 436 and 434. Each of code subregions 436 and 434 may be scannable independently of internal code region 432. One or more of code regions 436, 434 and 432 may encode a digital signature. Scanning device 301 may be configured to verify the encoded digital signature before processing any other instructions encoded in MRL 100. Verifying the digital signature may confirm that the instructions encoded in MRL 100 do not include malware.

Code regions of MRL 100 may be processed stagewise. Stagewise processing of code regions may include, in a first stage, initiating uploading instructions extracted from a first code region to scanning device 301. In a second stage, the processing may include determining whether a second code region includes a valid digital signature. After verifying the digital signature, a third stage may include enabling executing the instructions extracted from the first region of scanned MRL 100.

Figure 5A:
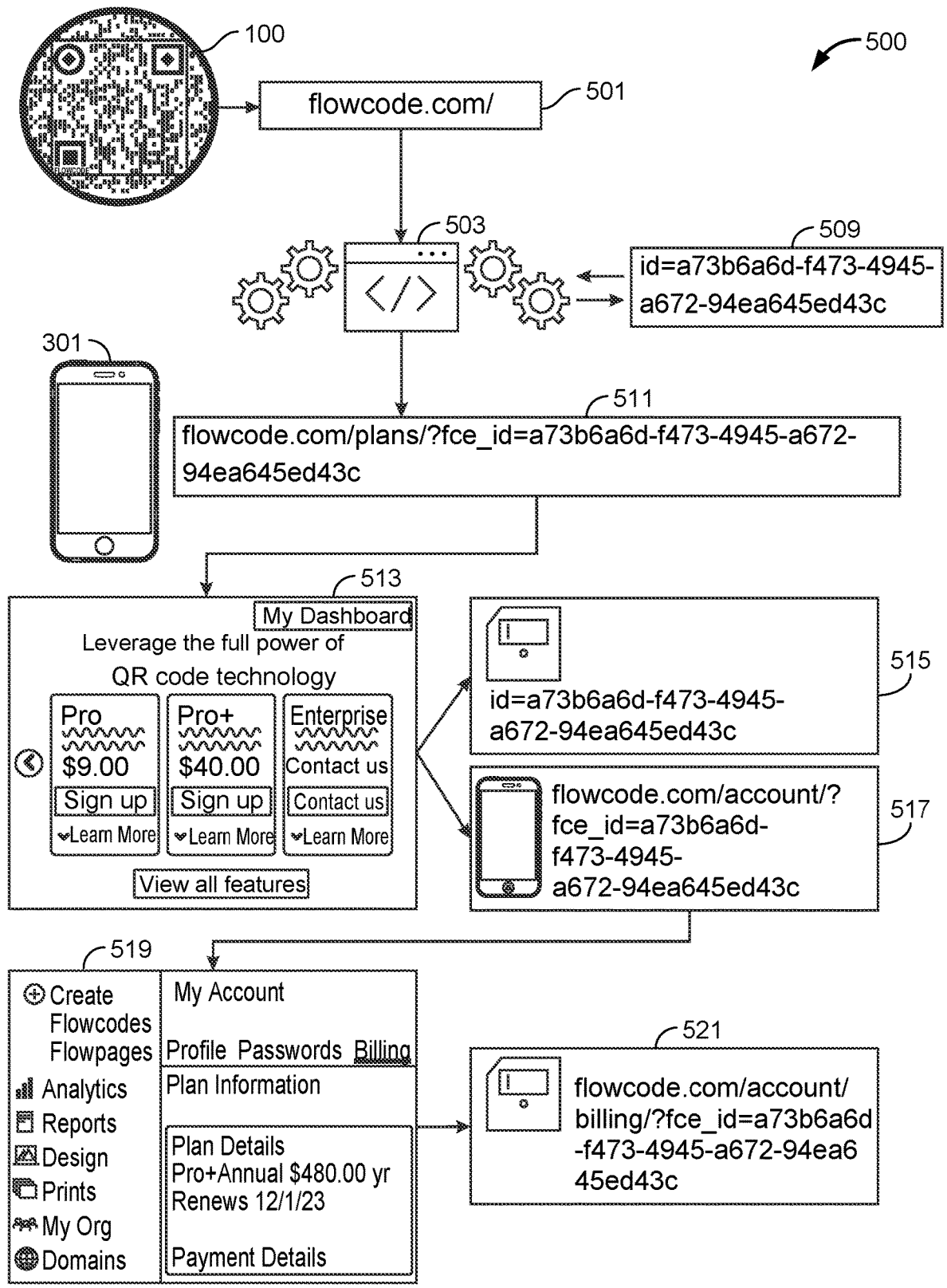
FIG. 5A shows an illustrative process in accordance with principles of the disclosure.

FIG. 5A shows illustrative process 500. Process 500 may begin when scanning device 301 scans MRL 100. In response to scanning MRL 100, default URL 501 is extracted by scanning device 301. Default URL 501 may be submitted to redirect service 503. Scanning device 301 may be connected to redirect service 503 by an application running on scanning device 301. In some embodiments, default URL may include information that directs scanning device to redirect service 503.

Process 500 shows that redirect service 503 generates unique identifier 509. Process 500 shows that redirect service 503 generates redirect URL 511. Redirect service 503 generates redirect URL 511 that includes unique identifier 509. Unique identifier 509 is shown appended to redirect URL 511 as a parameter that is submitted to a target website ("flowcode.com") identified in the redirect URL. For example, unique identifier 509 may appended to redirect URL as query or Urchin Tracking Module ("UTM") parameter.

Redirect URL 511 may direct scanning device 301 to webpage 513 ("flowcode.com/plans/") of the target website. the target website may store unique identifier 509 in local storage 515. Local storage 515 may be on scanning device 301, a remote server hosting the target website or any suitable non-transitory memory. The target website may include programming that monitors activity on webpage 513.

Scanning device 301 may navigate from webpage 513 ("flowcode.com/plans/") to webpage 519 ("flowcode.com/account/billing"). The programming of the target website may persist unique identifier 509 as scanning device 301 navigates through different webpages of the target website. Webpage URL 517 shows that unique identifier 509 has been persisted by appending unique identifier 509 to the URL for webpage 519.

The target website may include programming that monitors activity on webpage 519. Process 500 shows that the programming has detected a conversion event 521 corresponding to signing up for an annual service plan. In response to detecting conversion event 521 on webpage 519, conversion event 521 may be stored and associated with unique identifier 509. Conversion events or other activity detected on the target website may be linked, via the unique identifier 509, to a location of MRL 100, a timestamp associated with the scan of MRL 100, one or more conversion events and any other scan event details.

Unique identifier 509 may also be stored in local storage on scanning device 301. Scanning device 301 may return to webpages 513 or 519 a week after scanning MRL 100 to upgrade or purchase another product/service and resulting conversion event would still be attributed to unique identifier 509.

Figure 5B:
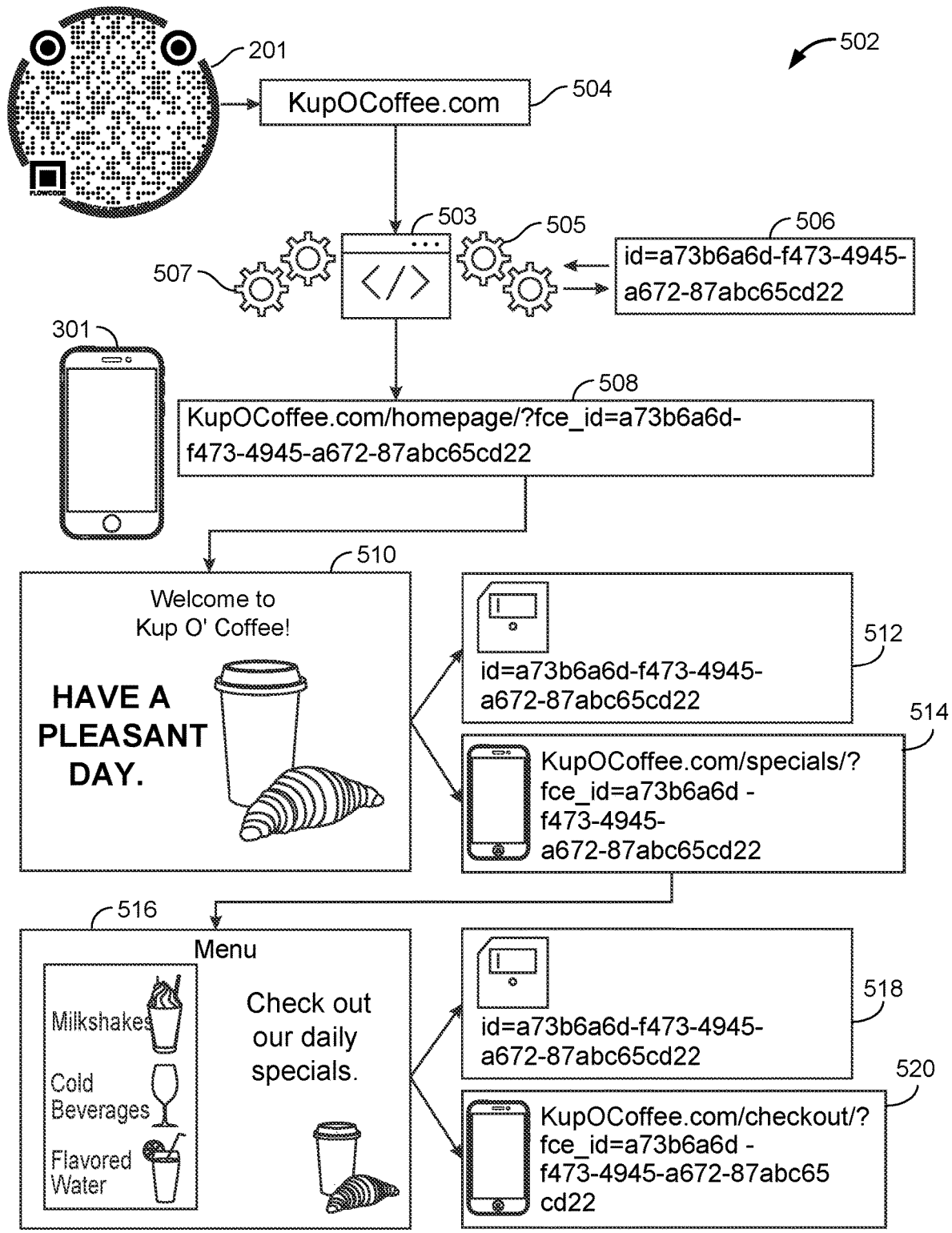
FIGS. 5B and 5C show an illustrative process in accordance with principles of the disclosure.
Figure 5C:
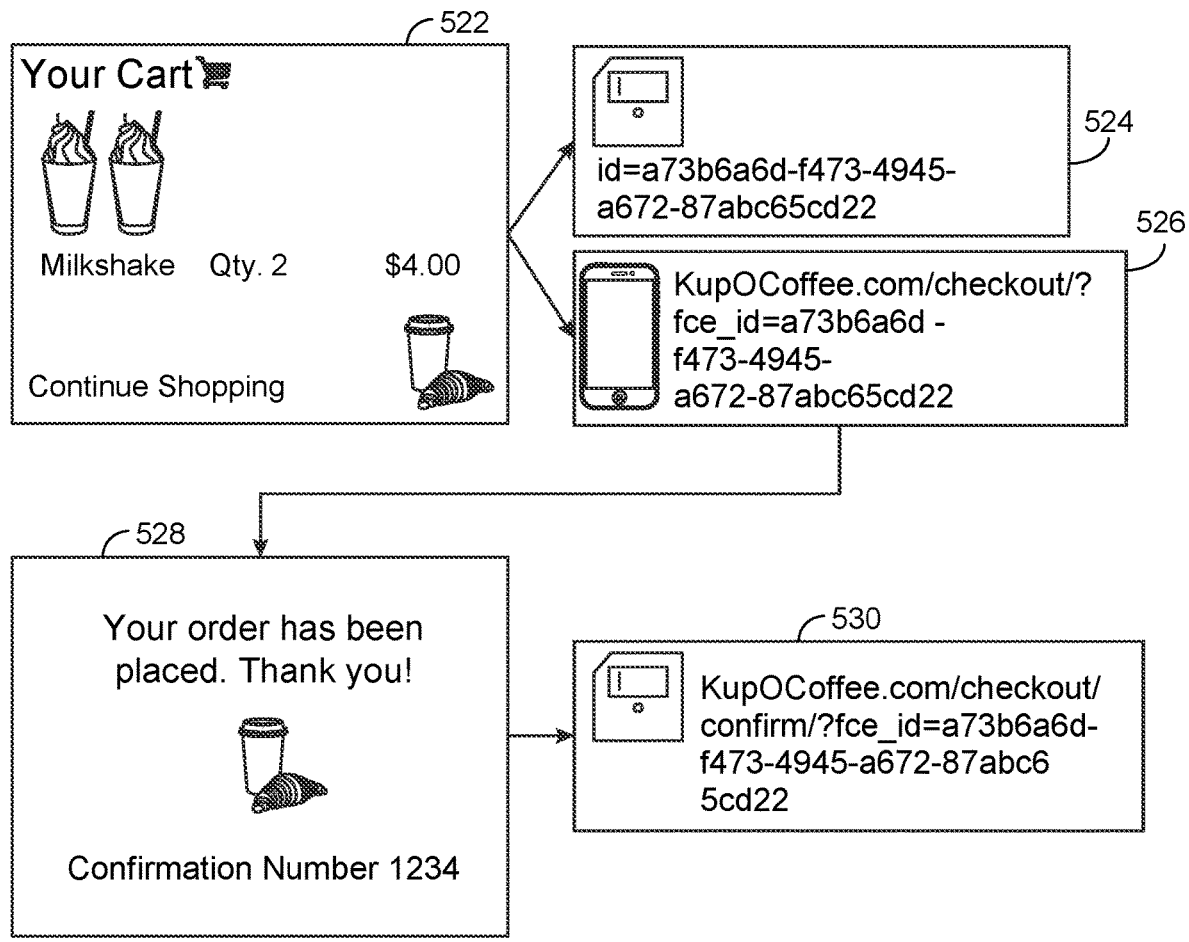

FIGS. 5B and 5C show illustrative process 502. Process 502 may begin when scanning device 301 scans MRL 201 (shown in FIG. 2). In response to scanning MRL 201, default URL 504 is extracted by scanning device 301. Default URL 504 may be submitted to redirect service 503. Scanning device 301 may be connected to redirect service 503 by an application running on scanning device 301. In some embodiments, default URL may include information that directs scanning device to redirect service 503.

Process 502 shows that redirect service 503 generates unique identifier 506. Unique identifier 506 is different from unique identifier 509 (shown in FIG. 5A). Process 502 shows that redirect service 503 generates redirect URL 508. Redirect service 503 generates redirect URL 508 that includes unique identifier 506. Unique identifier 508 is shown appended to redirect URL 508 as a parameter that is submitted to a target website ("KupOCoffee.com") identified in the redirect URL. For example, unique identifier 506 may appended to redirect URL as query or Urchin Tracking Module ("UTM") parameter.

Redirect URL 508 may direct scanning device 301 to webpage 510 ("KupOCoffee.com/homepage/") of the target website. the target website may store unique identifier 506 in local storage 512. Local storage 512 may be on scanning device 301, a remote server hosting the target website or any suitable non-transitory memory. The target website may include programming that monitors activity on webpage 510.

Scanning device 301 may navigate from webpage 516 ("KupOCoffee.com/homepage/") to webpage 519 ("KupO-Coffee.com/specials/"). The programming of the target website may persist unique identifier 506 as scanning device 301 navigates through different webpages of the target website. Webpage URL 514 shows that unique identifier 506 has been persisted by appending unique identifier 506 to the URL for webpage 516.

The target website may include programming that monitors activity on webpage 516. Process 502 shows that the programming has detected a first conversion event 521 corresponding to adding a "drink special" to an online checkout cart. In response to detecting first conversion event 520 on webpage 519, first conversion event 520 may be stored and associated with unique identifier 506. Conversion events or other activity detected on the target website may be linked, via the unique identifier 506, to a location of MRL 201, a timestamp associated with the scan of MRL 201, one or more conversion events and any other scan event details.

In response to activity (e.g., first conversion event 520) on webpage 516, a user may be presented with webpage 522. The target website may include programming that monitors activity on webpage 522. Process 502 shows that the programming has detected a second conversion event 526 corresponding to using webpage 533 to finalize payment for the "drink special" in the online checkout cart. In response to detecting second conversion event 526 on webpage 522, second conversion event 522 may also be stored and associated with unique identifier 506. First and second conversion events 520 and 526 or other detected activity the on the target website may be linked, via the unique identifier 506, to a location of MRL 201, a timestamp associated with the scan of MRL 201, one or more conversion events and any other scan event details.

Unique identifier 506 may also be stored in local storage on scanning device 301. A user operating scanning device 301 may or may not purchase a product or otherwise trigger conversion event when redirected by URL 508 to webpage 510 in response to scanning MRL 201. The user may return to webpage 510 at a later time. The later time may be any suitable amount of time after scanning MRL 201. For example, the later time may be 3 hours, a day, week, month, three months, year or five years after scanning MRL 201. At the later time, the user may visit the target website ("KupO-Coffee.com") and purchase a product or otherwise trigger a conversion event (e.g., on webpage 510). Because unique identifier 506 was stored in local storage on scanning device 301, the later in time conversion event may be attributed to unique identifier 506 and the prior scan of MRL 201.

FIG. 6A shows illustrative data record 600. Information stored in data record 600 may be updated by a redirect service. Information stored in data record 600 may be updated by a target website. Information stored in data record 600 may be updated by a scanning device.

Data record 600 includes actions taken by a scanning device. Data record 600 includes information associated with a scan, browse and conversion events performed by the scanning device. Data record 600 shows that the scanning device has extracted a URL in response to scanning an MRL. Data record 600 shows that a unique identifier has been generated and associated with the scan.

Data record 600 shows that the scanning device has browsed a target website "flowcode.com" using a URL that includes the unique identifier. Data record 600 shows that a conversion event has been associated with the unique identifier. Information in data record 600 may be provided by multiple sources. For example, information included in data record 600 may be provided by a scanning device, a redirect service and a target website. Storage and access to data record 600 may be coordinated by a redirect service or a target website. In some embodiments, a cloud-based software application may store and provide access to data record 600.

Based on information stored in data record 600, a detected online activity (such as a conversion event or browsing of a target website) may be linked to an offline activity (such as an MRL scan or other scan event details). For example, the linking of offline to online activity may allow for calculating ROI associated with an MRL, building targeted audiences for an MRL and determining target locations for displaying the MRL. Information stored in data table 600 includes a scan event details 604 and 606. Offline information associated with one or more of scan event details 604 and 606 may be linked to activity of the mobile device on a target website or other online activity.

Figure 6B:
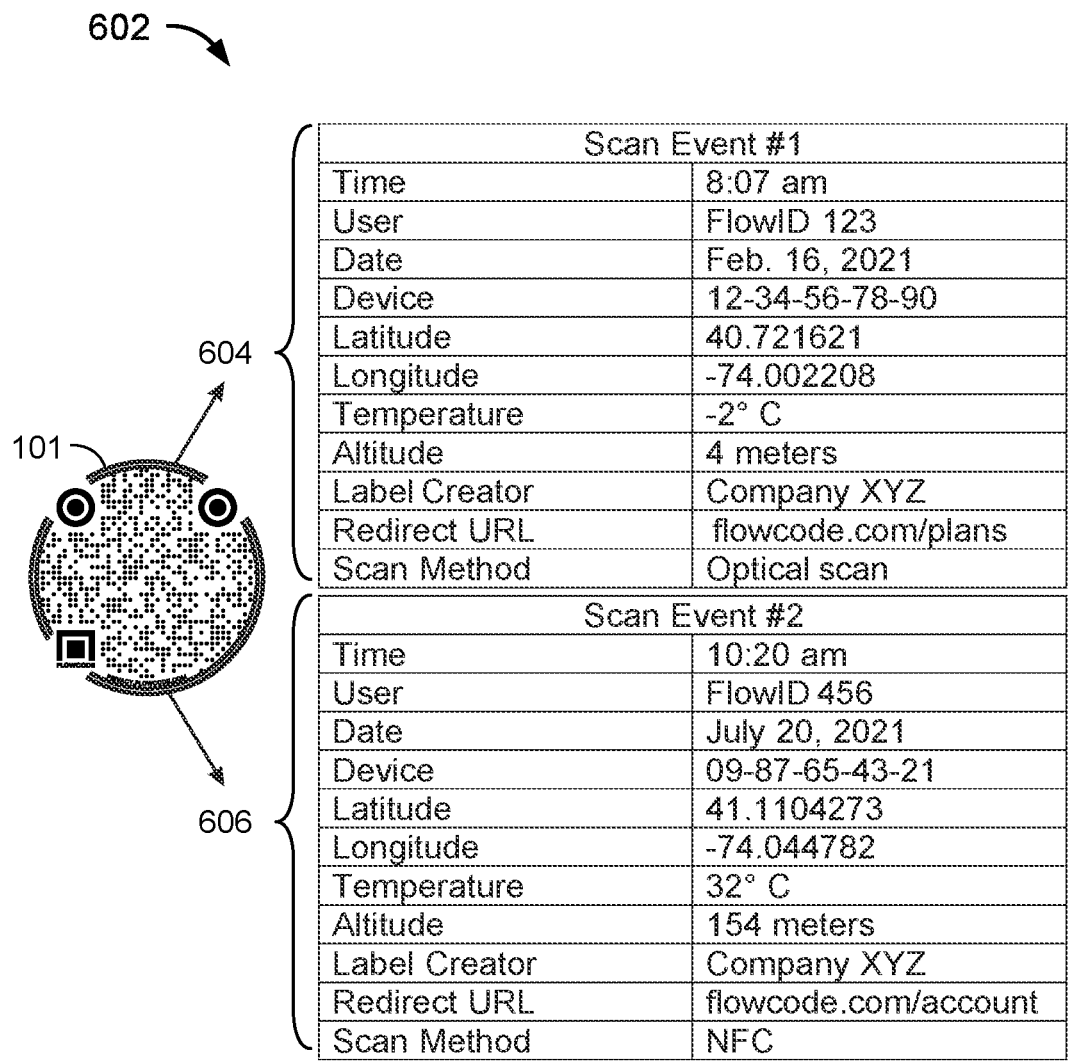
FIG. 6B shows illustrative operation of a software tool in accordance with principles of the disclosure.

FIG. 6B shows illustration information 602 that may be included in scan event details 604 and 606. Information 602 shows that scan event details 604 may be captured in response to device 301 scanning MRL 100. Information 602 shows that scan event details 606 may be captured in response device 301 scanning MRL 100. A redirect service may apply a machine learning algorithm, such as a deep neural network ("DNN") to scan event details 604 and formulate a redirect URL or other content that will be presented on scanning device 301 in response to capturing scan event details 604. The redirect service may apply a machine learning algorithm, such as a DNN to scan event details 606 and formulate content presented on scanning device 301 in response to capturing scan event details 606. The redirect service may correlate scan event details 604 and 606 to online activity after mobile device 301 accesses the redirect URL or other content presented in response to scan event details 604 or 606.

Figure 7:
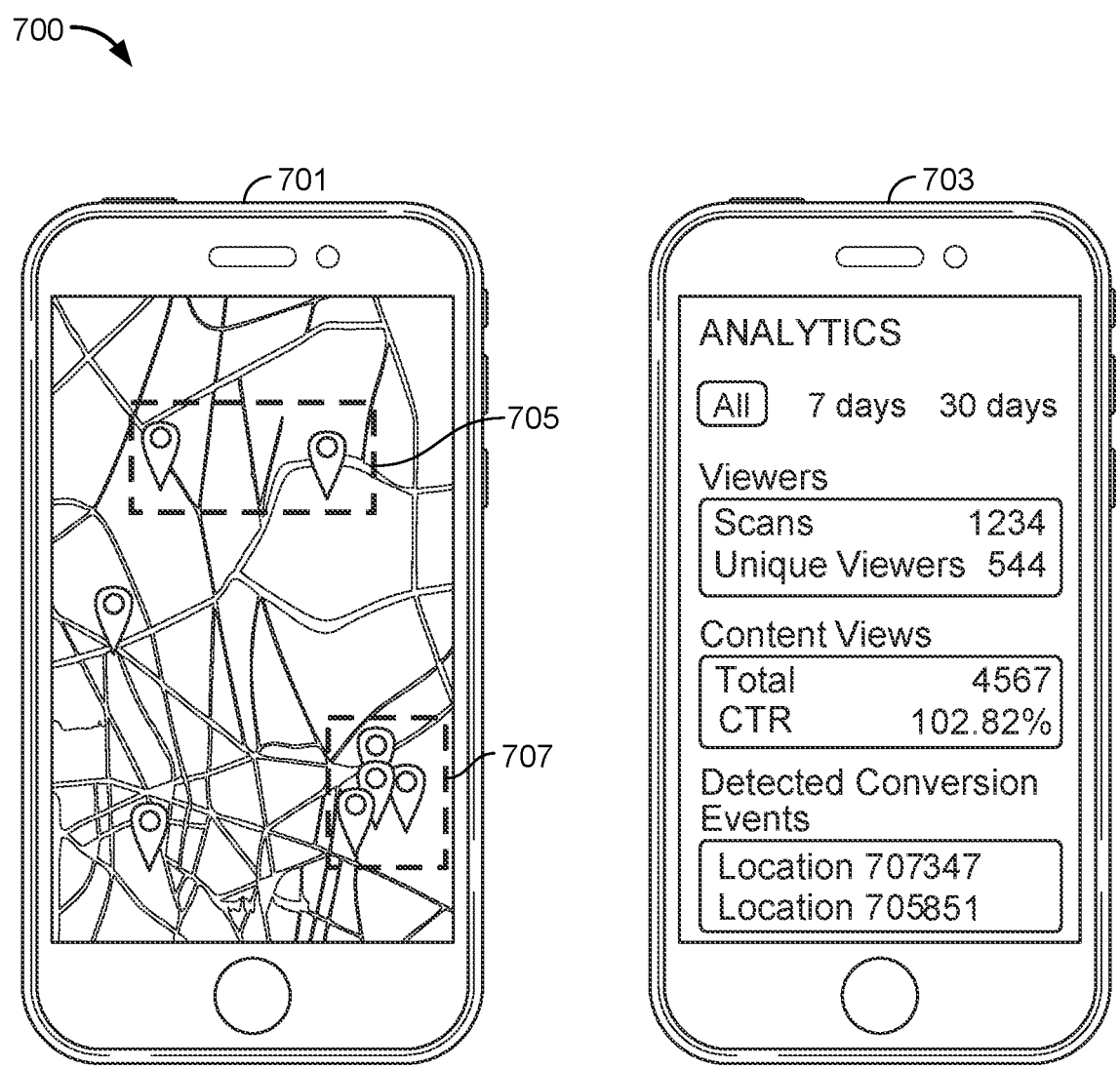
FIG. 7 shows illustrative features of a software tool in accordance with principles of the disclosure.

FIG. 7 shows illustrative performance metrics 700 that may be generated based on user activity associated with scanning MRL 100. Screenshot 701 shows a map of instances of MRL 100 located in different geographical regions that have each been scanned by a scanning device. Each scan of MRL 100 may be linked to a conversion event or other online activity. Screenshot 701 may represent a map of augmented reality ("AR") or virtual reality ("VR") presentations triggered by scanning an MRL 100 or any other suitable action triggered by scanning MRL 100.

Screenshot 701 shows that for instances of MRL 100 located within target geographic regions 707 may trigger different actions on different scanning devices compared to instances of MRL 100 located within target geographic regions 705. The specific action triggered on a specific scanning device in response to scanning a specific instance of MRL 100 may be determined by a redirect service based on one or more captured scan event details.

Screenshot 703 shows performance metrics that may be associated with content displayed on a scanning device in response to scanning an instance of MRL 100. Illustrative content displayed on a scanning device may include a target website. Performance metrics may be captured based on tracking code, such as a pixel or cookie, embedded in content presented to a scanning device.

Screenshot 703 shows performance metrics corresponding to conversion events (measured by detecting clicks or touch points) on a target website displayed on a scanning device in response to a scan of MRL 100. A redirect service may dynamically determine or change content presented to a scanning device in response to a scan of MRL 100 based on performance metrics shown in screenshot 703. For example, content displayed on a webpage may be reordered based on generating target performance metrics. The redirect service may direct a scanning device to a webpage on a target website that, based on the performance metrics, is more to register a conversion event.

Figure 8:
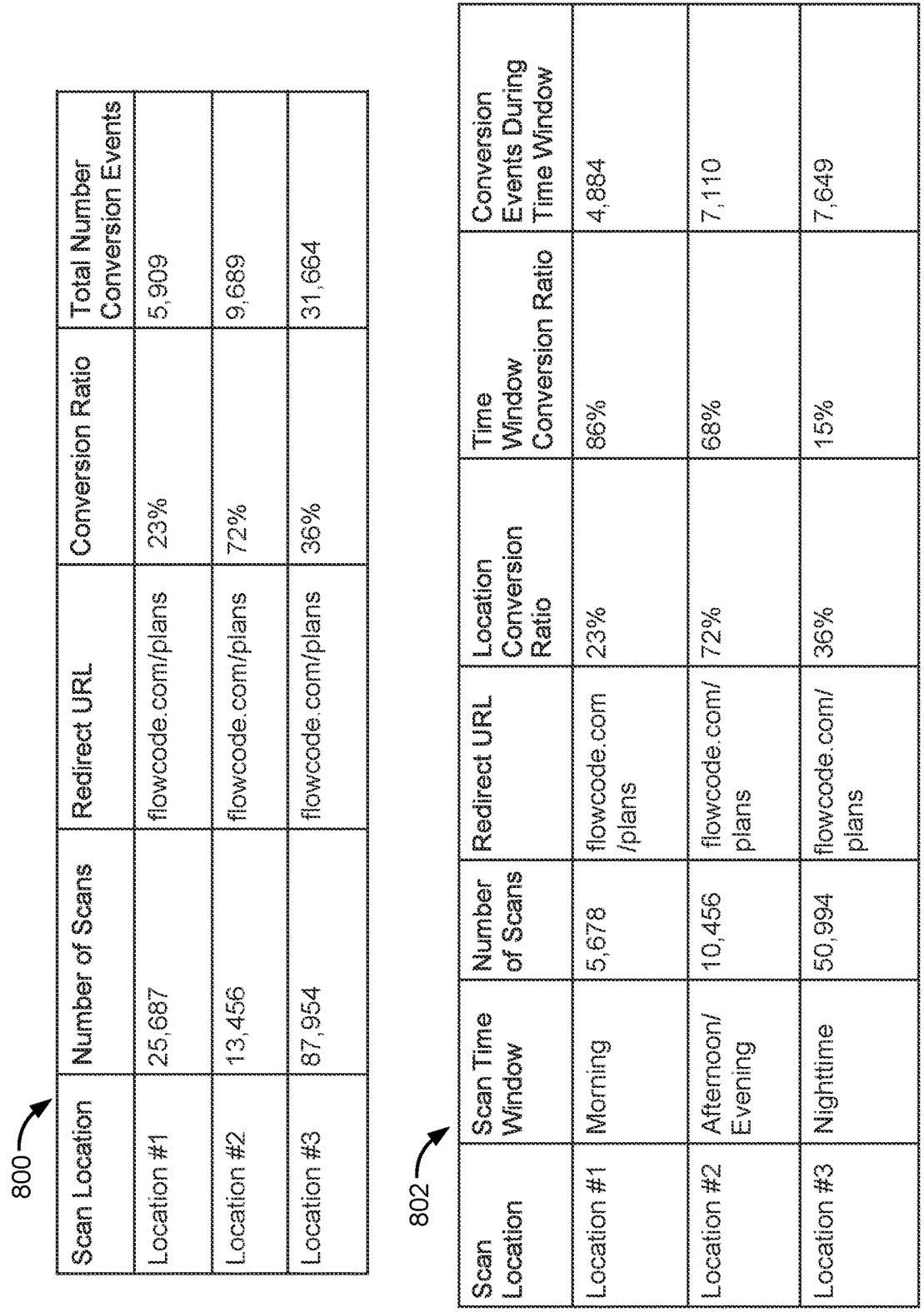
FIG. 8 shows illustrative features of a software tool in accordance with principles of the disclosure.

FIG. 8 shows illustrative performance metrics 800 and 802 that may be generated based on linking offline to online activity. Performance metrics 800 show a number of scans associated with different locations that display MRL 100. Performance metrics 800 also show the redirect URL that was generated in response to the scans of MRL 100 at each location and a conversion ratio for each location.

The conversion ratio may be defined by a number of conversion events divided by a total number of visitors. The conversion ratio or any other performance metric that links offline to online activity may provide metrics for measuring the performance of a target website and its associated webpages and apps. A conversion event may include any desired online action. Illustrative conversion events may include clicking on a button displayed on a webpage or completing a purchase via a webpage.

Performance metrics 802 show a number of scans of MRL 100 at different times of day and at different locations. Performance metrics 802 show a conversion ratio for a redirect URL during different time windows at each location compared to the overall conversion ratio at the location.

By continually identifying new conversion ratio goals and implementing tests of new features/content on a webpage, performance of a target website may be improved. For example, a redirect service may direct scanning devices to different versions of the target website. The different versions of the target website may be leveraged to implement A/B testing to determine which one version of the target website performs better (e.g., has a higher conversion ratio).

Figure 9:
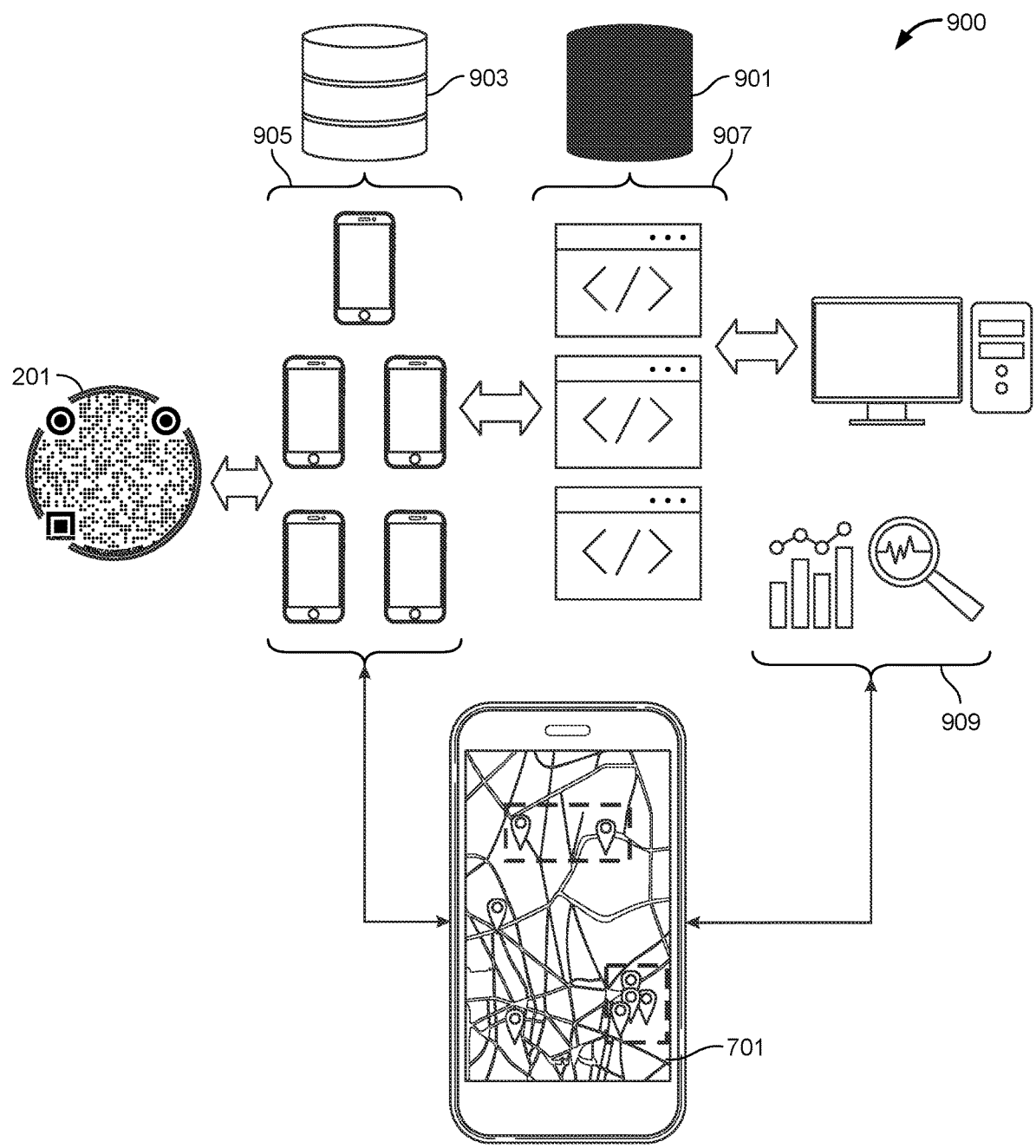
FIG. 9 shows an illustrative system in accordance with principles of the disclosure.

FIG. 9 shows illustrative system 900. System 900 includes scanning devices 905. Each of scanning devices 905 may scan an MRL such as MRL 100 or MRL 201. In response to scanning the MRL, each of scanning devices 905 may capture one or more scan event details and connect to redirect service 909. Redirect service 909 may capture one or more scan event details. Redirect service 909 may generate a redirect URL and a unique identifier for each of scanning devices 905. The unique identifier may be appended to the redirect URL. Redirect service 909 may create a record for each of scanning devices 905. Redirect service 909 may save the redirect URL, unique identifier and associated scan event details in the record of each of scanning devices 905. The records are stored in database 901.

Using the redirect URL, each of scanning devices 905 may access one or more webpages 907 of a target website. When scanning devices 905 access webpages 907, the unique identifier generated by redirect service 909 may be saved in database 901. Browsing activity of scanning devices 905 on webpages 907 may be tracked. The browsing activity may be tracked by pixels or cookies associated with webpages 907. The browsing activity of each of scanning devices 905 may be stored in database 901. The records of each of scanning devices 905 stored in database 901 may also include the unique identifier included in the redirect URL.

Records stored in databases 901 and 903 may be merged. For example, redirect service 909 may obtain a copy of the browsing activity stored in database 901. Database 901 may obtain a copy of scan event details stored by redirect service 909 in database 903. Because records stored in database 901 and 903 are both indexable by the unique identifier, offline scans of MRLs by scanning devices 905 may be linked to online browsing activity of scanning devices 905. Performance metrics shown in screenshot 701 may be generated based on linking the offline activity of scanning devices 905 to their online activity. For example, screenshot 701 may represent scans of MRL 201 that are associated with a threshold conversion ratio on a target website.

Linking the offline to online activity may enhance security and data quality associated with MRL scans. Each conversion event on a target website can be traced back to a unique identifier and a specific MRL scan and the scans associated scan event details (e.g., timestamp and geolocation).

Thus, methods and apparatus for OFFLINE TO ONLINE CONVERSION LINKAGE are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for computationally linking offline action of a user to online action of the user, the method comprising:
 detecting a scan of a machine-readable label ("MRL") at a target location;
 in response to the scan of the MRL, generating:
  a redirect uniform resource locator ("URL"); and
  a unique identifier;
 incorporating the unique identifier into the redirect URL;
 persisting the unique identifier while the user browses a target website accessed using the redirect URL; and
 in response to detecting a conversion event on the target website, linking the conversion event, via the unique identifier to:
  the scan of the MRL; and
  the target location of the MRL.

2. The method of claim 1 further comprising based on the linking of the conversion event to the target location, dynamically changing the target location of the MRL.

3. The method of claim 1 wherein the target location is a first target location, the method further comprising, in response to linking the conversion event to the first target location, presenting the MRL at a second target location.

4. The method of claim 1, wherein the user is a first user, the scan of the MRL is a first scan by the first user, the unique identifier is a first unique identifier and the conversion event is a first conversion event, the method further comprising:
 detecting a second scan of the MRL by a second user;
 associating a second unique identifier with the second scan of the MRL; and
 linking a second conversion event on the target website to the second scan.

5. The method of claim 1, wherein the target location is a first target location, the MRL comprises a data zone, the unique identifier a first unique identifier and the conversion event a first conversion event, the method further comprising:
 capturing information encoded in the data zone from a second target location;
 in response to capturing the information encoded in the data zone, generating:
  the redirect URL; and
  a second unique identifier; and
 linking:
  a second conversion event on the target website to the information encoded in the data zone; and
  the information encoded in the data zone to the first target location and to the second target location.

6. The method of claim 5, wherein the MRL is a first MRL and the information encoded in the data zone captured at the first target location is incorporated into a first MRL and the information encoded in the data zone captured at the second target location is incorporated into a second MRL.

7. The method of claim 2, wherein the changing of the target location comprises changing a time when the MRL is viewable during playback of an electronic file.

8. The method of claim 2 wherein the changing of the target location comprises changing a viewable position at which the MRL is presented during playback of an electronic file.

9. The method of claim 1 further comprising:
 detecting the scan of the MRL at a target time; and
 linking the conversion event to the scan of the MRL at least 24 hours after the target time.

10. The method of claim 1 wherein the MRL is a first MRL, the method further comprising:
 detecting a scan of a second MRL;
 linking the scan of the second MRL to the unique identifier;
 in response to detecting the conversion event on the target website, linking:
  the conversion event to the scan of the second MRL via the unique identifier; and the conversion event to the target location of the second MRL.

11. The method of claim 10 further comprising redirecting scans of the first MRL and the second MRL to the redirect URL associated with the target website.

12. A system architecture that links offline action of a user to online action of the user, the system architecture comprising:
a machine-readable label ("MRL") that encodes machine-readable instructions;
a scanning device that:
extracts the machine-readable instructions from the MRL;
accesses a redirect service using the machine-readable instructions; and
receives a redirect uniform resource locator ("URL") and a unique identifier generated by the redirect service;
stores the unique identifier in a first location; and
accesses a target website using the redirect URL; and
the target website is programmed to:
detect a conversion event; and
in response to the conversion event, store the unique identifier in a second location; and
in response to detecting the unique identifier in the first location and in the second location, link the MRL to the conversion event.

13. The system architecture of claim 12 wherein the target website is further programmed to persist the unique identifier as the user navigates the target website accessing using the redirect URL.

14. The system architecture of claim 12 the target website further comprising a pixel that is programmed to:
parse the redirect URL;
extract the unique identifier; and
store the unique identifier in the first location.

15. The system architecture of claim 12 wherein the target website stores:
the unique identifier in the first location at a first time; and
the unique identifier in the second location at a second time;
wherein the first time is earlier than the second time.

16. The system architecture of claim 15 wherein a time window between the first time and the second time is at least a week.

17. The system architecture of claim 12 wherein:
the MRL is positioned in a geographic location;
the conversion event is one of a plurality of conversion events that are linked to the MRL; and
based on the plurality of conversion events, the redirect service is configured to compute a conversion ratio of the target website for the MRL positioned in the geographic location.

18. The system architecture of claim 12 wherein the first location is a memory location associated with a browser installed on the scanning device.

19. A system architecture that links an offline action to an online action, the system architecture comprising:
a machine-readable label ("MRL") that comprises a data zone;
a scanning device that:
registers the offline action by reading the data zone of the MRL;
using information encoded in the data zone, accesses a redirect service; and
receives a redirect uniform resource locator ("URL") and a unique identifier generated by the redirect service; and
accesses a target website using the redirect URL; and
the target website:
stores the unique identifier in a memory location;
persists the unique identifier as the scanning device navigates from a first page of the target website identified by the redirect URL to a second page of the target website identified by a page URL;
detects that the scanning device triggers an online action on the second page of the target website;
in response to the online action, determines whether the page URL includes the unique identifier; and
in response to detecting the unique identifier in the memory location and in the page URL, creates a link connecting the offline action and the online action.

20. The system architecture of claim 19 wherein the offline action is a first offline action, the unique identifier is a first unique identifier, the scanning device is a first scanning device, the memory location a first memory location and the system architecture comprising:
a second scanning device that:
registers a second offline action by reading the data zone;
using information encoded in the data zone, accesses the redirect service;
receives the redirect URL and a second unique identifier generated by the redirect service; and
accesses a target website using the redirect URL;
the target website:
stores the second unique identifier in a second memory location;
persists the unique identifier as the second scanning device navigates from the first page of the target website identified by the redirect URL to the second page of the target website identified by the page URL;
detects that the second scanning device triggers the online action on the second page of the target website;
in response to the online action, determines whether the page URL includes the second unique identifier; and
in response to detecting the second unique identifier in the second memory location and in the page URL, links the second offline action and the online action.

21. The system architecture of claim 19, wherein the memory location comprises local storage on the scanning device.

22. The system architecture of claim 21, wherein the memory location a first memory location and the target website stores the unique identifier in a second memory location in response to the online action.

23. The system architecture of claim 22, wherein the second memory location comprises local storage on the scanning device.

24. The system architecture of claim 19, wherein the online action is a transaction that includes purchase of a product or service via the target website.

25. The system architecture of claim 20 wherein the data zone read by the first scanning device is included in a first MRL and the data read by the second scanning device is included in a second MRL.

26. The system architecture of claim 25, wherein the first MRL is displayed at a first geographic location and the second MRL is displayed at a second geographic location.

27. The system architecture of claim 25, wherein the first MRL is displayed within a first media stream and the second MRL is displayed within a second media stream.

28. The system architecture of claim 27 in response to linking the first offline action and the second offline action to the online action, determining a position of a third MRL within a third media stream.

29. The system architecture of claim 19, wherein the target website utilizes:
- a first pixel embedded in the first page to extract the unique identifier from the redirect URL; and
- a second pixel embedded in the second page to extract the unique identifier from the page URL.

* * * * *